(12) United States Patent
Brown

(10) Patent No.: US 10,853,160 B2
(45) Date of Patent: Dec. 1, 2020

(54) METHODS AND SYSTEMS TO MANAGE ALERTS IN A DISTRIBUTED COMPUTING SYSTEM

(71) Applicant: VMware, Inc., Palo Alto, CA (US)

(72) Inventor: Darren Brown, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 216 days.

(21) Appl. No.: 15/971,762

(22) Filed: May 4, 2018

(65) Prior Publication Data
US 2019/0340048 A1 Nov. 7, 2019

(51) Int. Cl.
*G06F 11/07* (2006.01)

(52) U.S. Cl.
CPC ........ *G06F 11/079* (2013.01); *G06F 11/0727* (2013.01); *G06F 11/0751* (2013.01); *G06F 11/0769* (2013.01); *G06F 11/0793* (2013.01)

(58) Field of Classification Search
CPC . G06F 11/0769; G06F 11/0793; G06F 11/327
See application file for complete search history.

(56) References Cited

U.S. PATENT DOCUMENTS

| | | | | |
|---|---|---|---|---|
| 6,690,274 B1* | 2/2004 | Bristol | ............... | G05B 23/0267 340/506 |
| 7,137,074 B1* | 11/2006 | Newton | ............... | G06F 11/0748 715/835 |
| 9,836,342 B1* | 12/2017 | Mahapatra | .......... | G06F 11/0769 |
| 2002/0129141 A1* | 9/2002 | Sogabe | ................... | G06F 11/32 709/224 |
| 2007/0101208 A1* | 5/2007 | Mohr | ................... | G06F 11/0769 714/57 |
| 2007/0157116 A1* | 7/2007 | Johnson | .............. | G06F 11/0769 715/808 |
| 2010/0102982 A1* | 4/2010 | Hoveida | ............. | G06F 11/3072 340/691.3 |
| 2012/0060173 A1* | 3/2012 | Malnati | ............... | G06F 11/3055 719/318 |
| 2017/0160715 A1* | 6/2017 | De Boer | ................. | G06F 3/048 |

* cited by examiner

*Primary Examiner* — Yolanda L Wilson

(57) ABSTRACT

Computational methods and systems described herein manage alerts generated by event sources that run in a distributed computing system. Methods and system provide a graphical user interface that enables a user to define a dominant alert and select subsumed alerts generated by the event sources. Methods and systems may also compute a relative fraction that represents a number of times each alert is triggered with respect to a number of times another alert is triggered for each pair of alerts. The relative fractions may be displayed in the graphical user interface to allow a user to select dominant and subsumed alerts based on the relative fractions. Methods and systems identify log messages that correspond to user-identified subsumed alerts, suppress subsumed alerts and generate the dominant alert. Methods and systems may also execute remedial action to correct the problem represented by the dominant alert.

15 Claims, 39 Drawing Sheets

```
log.write([[$Time_date]  [Thread-$X/$IP/INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
```

FIG. 15

```
[2017-03-10 23:43:36.859+0000] [Thread-1822496/127.0.0.1 INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
```

FIG. 16

```
                                             ...         ← 1702
        ┌ 1708    ┌ 1710       :    ┌ 1712
────┐   │         │            :    │                              ┌────
    ├───┴─────────┴────────────┴────┴────────────────────┐
    │ 2017-12-02T10:44:24.095Z li-qe-esx5.vmware.com Rhttpproxy:  │ ──── 1704
    │ [28959B90 verbose 'Proxy Req 46691'] Connected to           │
    │ localhost:8307                              ── 1706         │
    ├─────────────────────────────────────────────────────────────┤
    │ 2017-12-02T10:44:24.094Z li-qe-esx5.vmware.com Rhttpproxy:  │
    │ [FFFC2B90 verbose 'Proxy Req 46691'] new proxy client       │
    │ TCP (local-127.0.0.1:80, peer=127.0.0.1:50155)              │
    ├─────────────────────────────────────────────────────────────┤
    │ 2017-12-02T10:44:24.093Z li-qe-esx5.vmware.com Rhttpproxy:  │
    │ [2889B90 verbose 'Proxy Req 46685'] The client closed the   │
    │ stream, not unexpectedly.                                   │
    ├─────────────────────────────────────────────────────────────┤
    │ Dec  2 18:48:29 strata-vc 2017-12-02T18:48:30.273Z          │
    │ [7FA39448B700 info 'commonvpxLro' opID=1947d6f9] [VpxLRO] - │
    │ FINISH task-internal-2163522 -- -- vim.SessionManager.logout - │
    ├─────────────────────────────────────────────────────────────┤
    │ 2017-12-02T18:48:51.396Z strata-esx1.eng.vmware.com Vpxa:   │
    │ [65B5AB90 verbose 'VpxaHalCnxHostagent' opID=WFU-ed393333]  │
    │ [WaitForUpdatesDone] Completed callback                     │
    ├─────────────────────────────────────────────────────────────┤
    │ 2017-12-02T18:48:51.395Z strata-esx1.eng.vmware.com Vpxa:   │
    │ [65B5AB90 verbose 'VpxaHalCnxHostagent' opID=WFU-ed393333]  │
    │ [WaitForUpdatesDone] Starting next WaitForUpdates() call to │
    │ hostd                                                       │
    ├─────────────────────────────────────────────────────────────┤
    │ 2017-12-02T18:48:51.395Z strata-esx1.eng.vmware.com Vpxa:   │
    │ [65B5AB90 verbose 'vpxavpxaInvtVm' opID=WFU-ed393333]       │
    │ [VpxaInvtVmChangeListener] Guest DiskInfo Changed           │
    ├─────────────────────────────────────────────────────────────┤
    │ 2017-12-02T18:48:51.395Z strata-esx1.eng.vmware.com Vpxa:   │
    │ [65B5AB90 verbose 'vpxavpxaInvtVm' opID=WFU-ed393333]       │
    │ [VpxaInvtVmChangeListener] Guest DiskInfo Changed           │
    └─────────────────────────────────────────────────────────────┘
                               :
                               :
```

To: adminstrator@alert.com

Subject: Synchronization with Application node $N_5$ failed

Message: This is an auto-generated alert. Application node $N_6$ cannot synchronize. Restart application node.

FIG. 23B

To: adminstrator@alert.com

Subject: Unresponsive application node $N_6$

Message: This is an auto-generated alert. Application node $N_6$ is non-responsive. Restart server computer.

To: adminstrator@alert.com

Subject: Network failure

Message: This is an auto-generated alert. Network used by the distributed application has failed. Restart routers.

FIG. 25B

METHODS AND SYSTEMS TO MANAGE ALERTS IN A DISTRIBUTED COMPUTING SYSTEM

TECHNICAL FIELD

This disclosure is directed to automated methods and systems that detect alerts in log messages and suppress superfluous alerts.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies.

Because distributed computing systems are large and run many thousands of applications, various monitoring tools have been developed to collect information, such as metric data and log messages, and analyze the information in an effort to detect performance problems. For example, an application may have slowed due to insufficient hardware or an overloaded network, a CPU may be running at maximum capacity for an extended period of time, or a data-storage appliance may have failed. Monitoring tools have been developed to detect these problems and generate alerts a system administrator can ideally use to identify the source of the problem. However, many alerts generated by a monitoring tool are false positives, because many of the alerts are generated by applications, operating systems, or pieces of hardware that are adversely impacted in different ways by the same underlying problem. In other words, one problem can create a cascade of other problems, each of which is detected and reported in one of many different types of alerts sent to the system administrator. A system administrator may receive tens, hundreds, or potentially thousands of alerts and devotes hours sorting through the alerts in an effort to identify the source of the problem. Large numbers of these alerts may be redundant while others may appear to be unrelated to the original problem but would not have been generated if not for the original problem. As a result, identifying the source of a performance problem from copious alerts becomes a nearly impossible, error prone, and an extremely time-consuming task for system administrators, which can lead to significant delays in responding to problems or executing remedial actions that do not actually correct the underlying problem.

SUMMARY

Computational methods and systems described herein are directed to managing alerts generated by one or more event sources that run in a distributed computing system. Methods and system provide a graphical user interface that enables a user to define a dominant alert and select one or more subsumed alerts generated by the one or more event sources. For each pair of alerts, methods and systems may also compute a relative fraction that represents a number of times each alert is triggered with respect to a number of times another alert is triggered within a time interval. The relative fractions may be displayed in the graphical user interface to allow a user to select dominant and subsumed alerts based on the relative fractions. Methods and systems search log-message files of the one or more event sources for log messages that correspond to identified subsumed alerts. When log messages that correspond to the subsumed alerts are identified, the subsumed alerts are suppressed while a single alert message that describes the dominant alert is generated. Methods and systems may also execute remedial action to correct a problem represented by the dominant alert.

DESCRIPTION OF THE DRAWINGS

FIG. 15 shows an example of a log write instruction.

FIG. 16 shows an example of a log message generated by a log write instruction.

FIG. 17 shows a small, eight-entry portion of a log-message file.

FIG. 23B shows an example of an alert message generated by a log management server.

FIG. 24B shows an example of an alert message generated by a log management server.

FIG. 25B shows an example of an alert message generated by a log management server.

DETAILED DESCRIPTION

Figure 1:
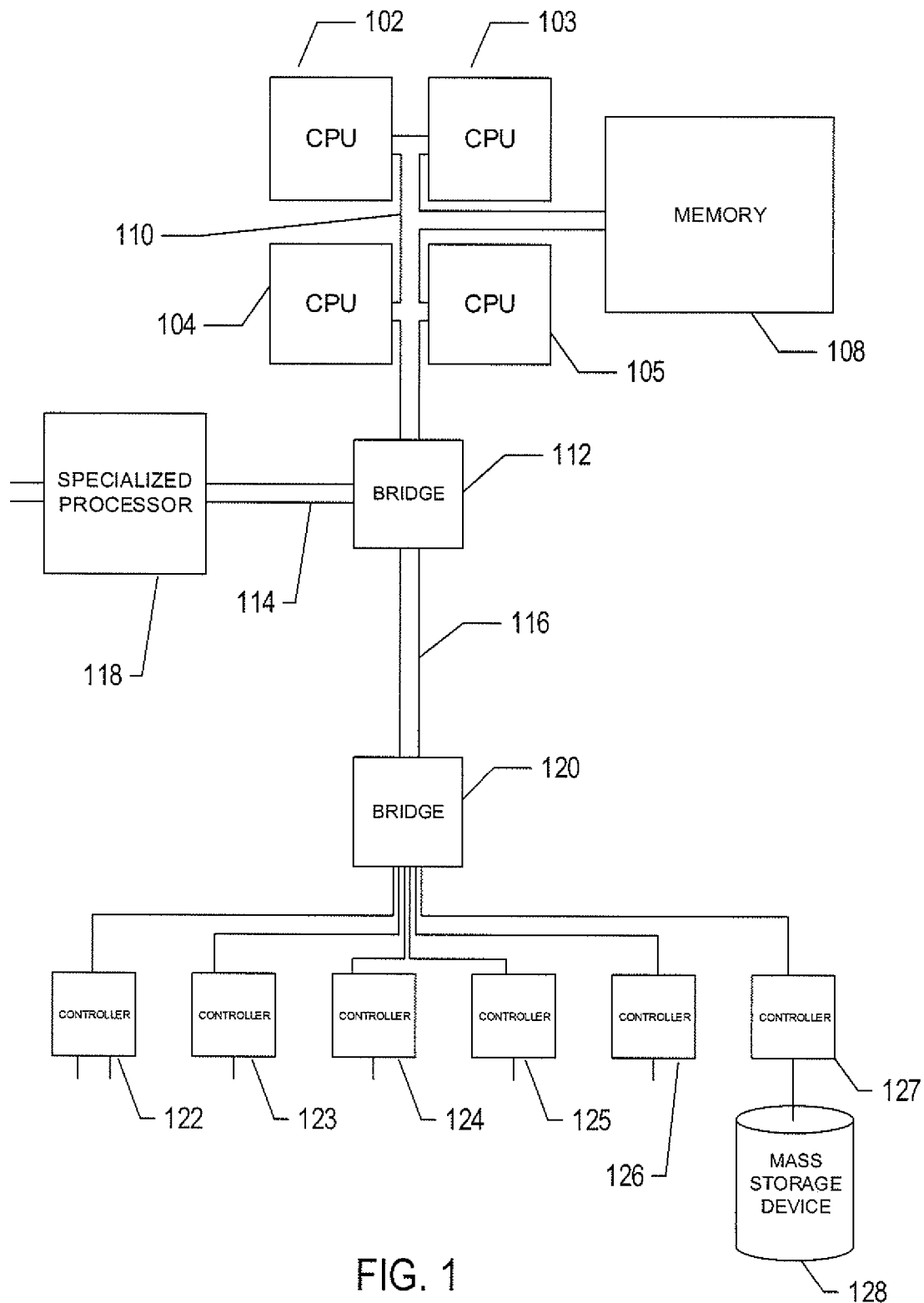
FIG. 1 shows an architectural diagram for various types of computers.

This disclosure presents computational methods and systems to manage alerts generated by one or more event sources that run in a distributed computing system. In a first subsection, computer hardware, complex computational systems, and virtualization are described. Containers and containers supported by virtualization layers are described in a second subsection. Logging event messages in log-message files is described in a third subsection. Methods to manage alerts generated by one or more event sources are described below in a fourth subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in teens of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, containers, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
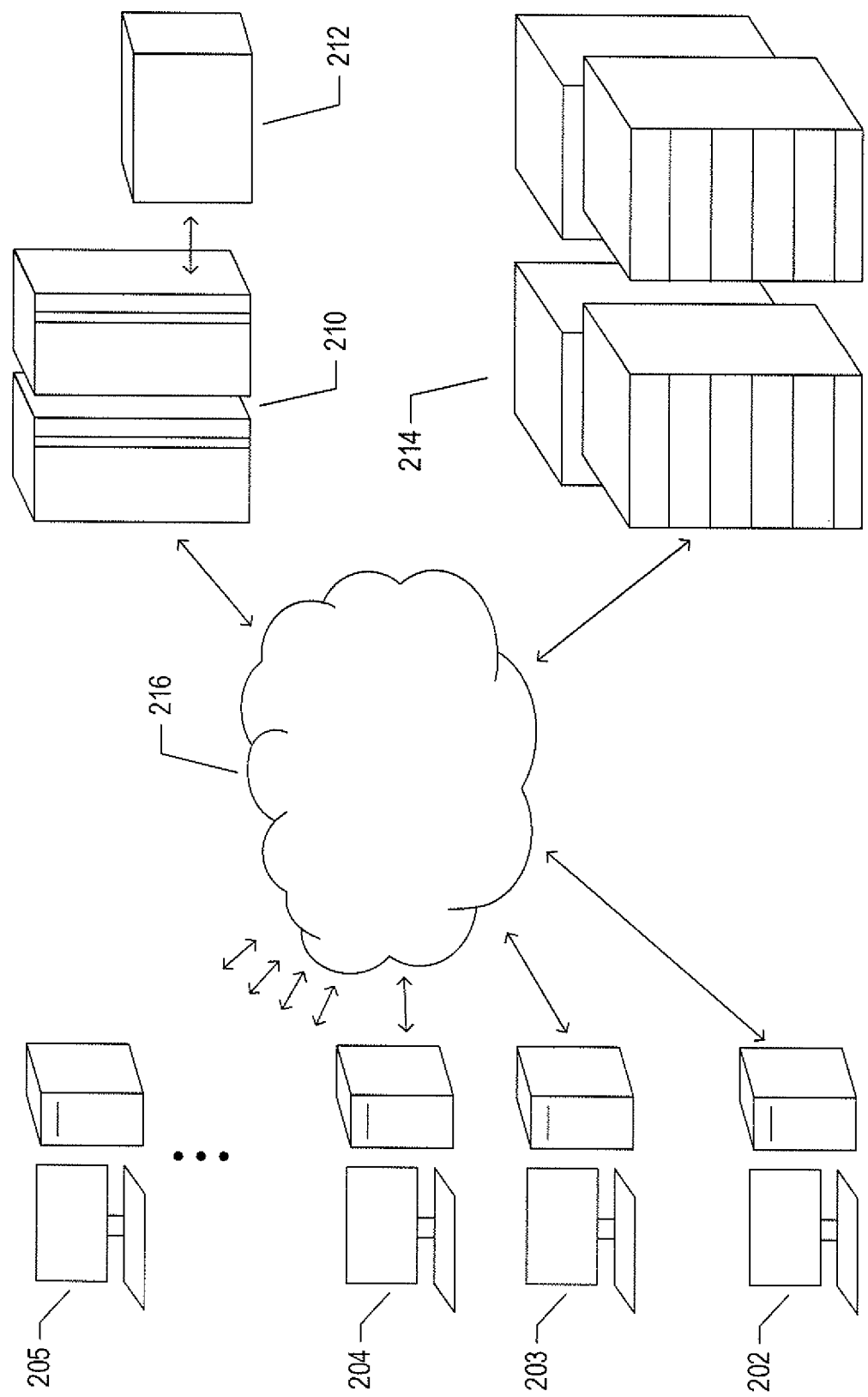
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
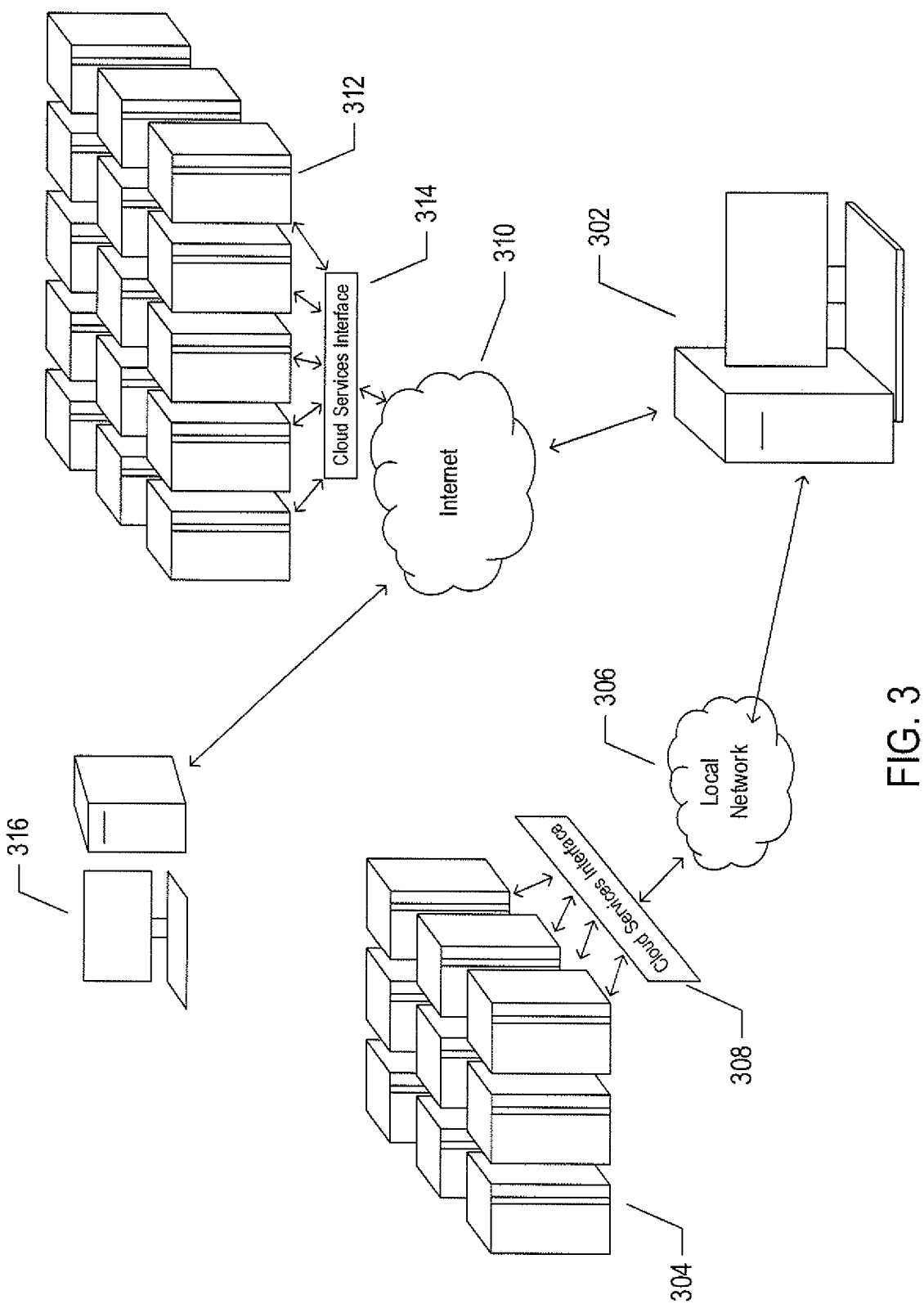
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
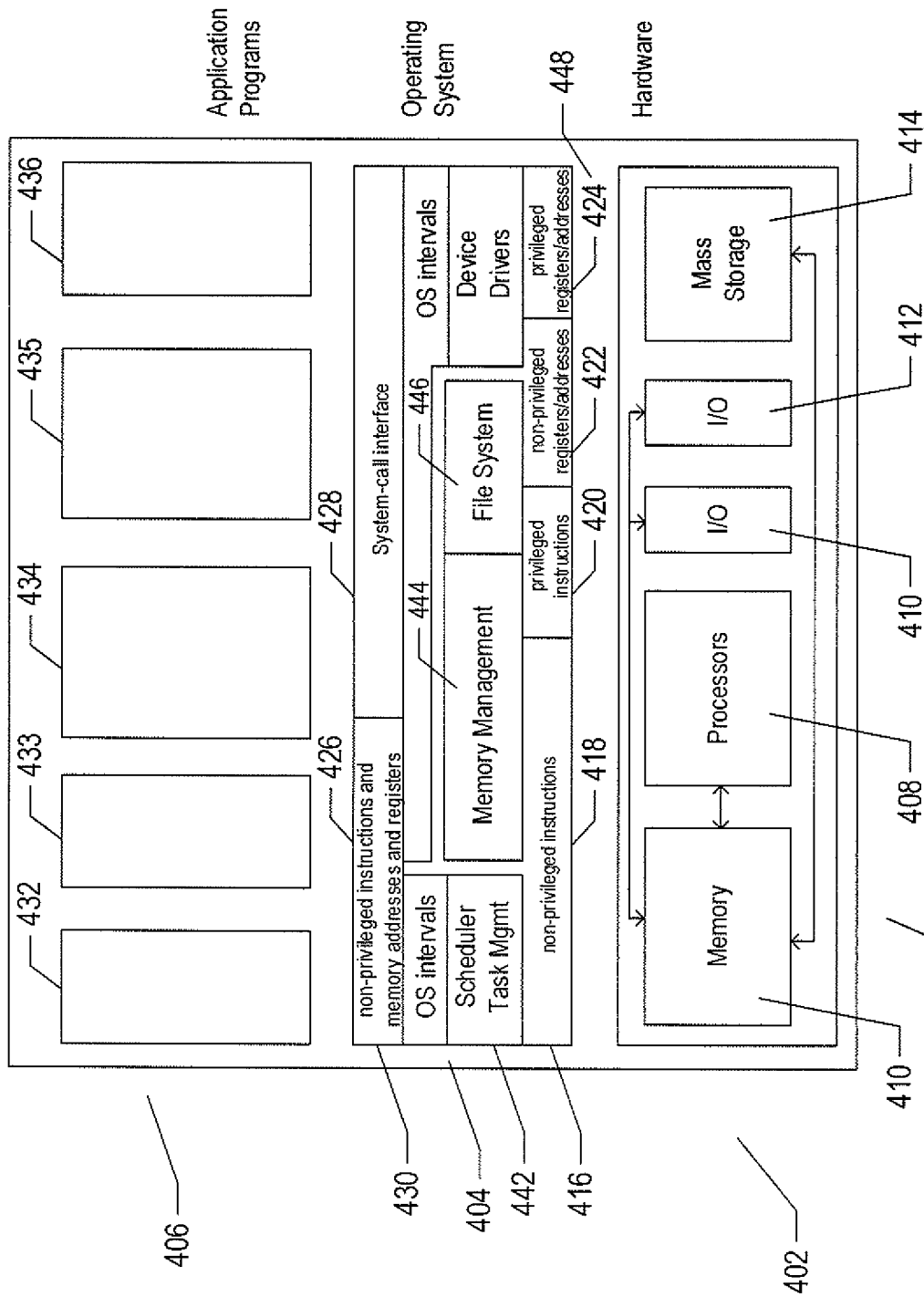
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
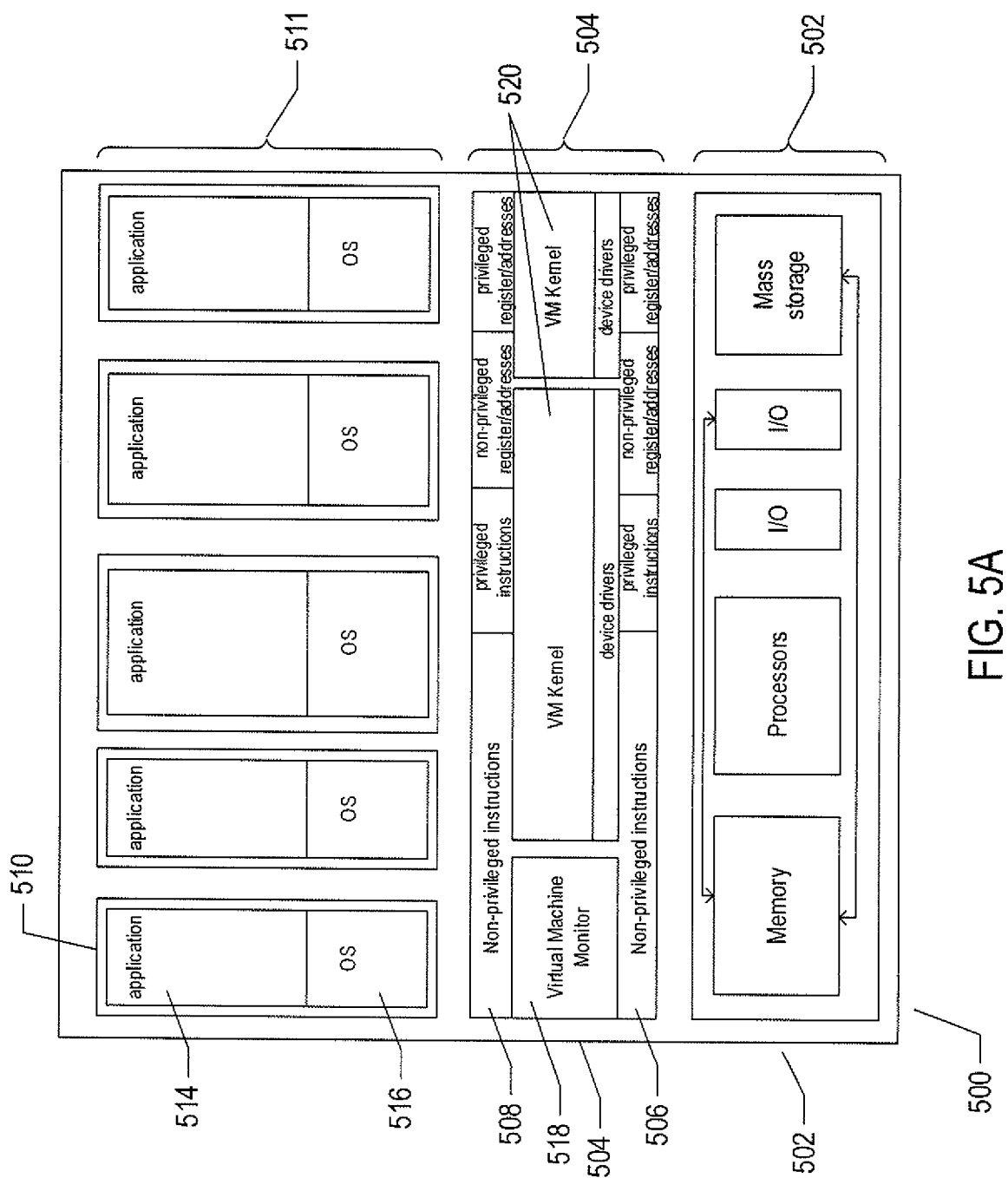
FIGS. 5A-5B show two types of virtual machine ("VM") and VM execution environments.
Figure 5B:
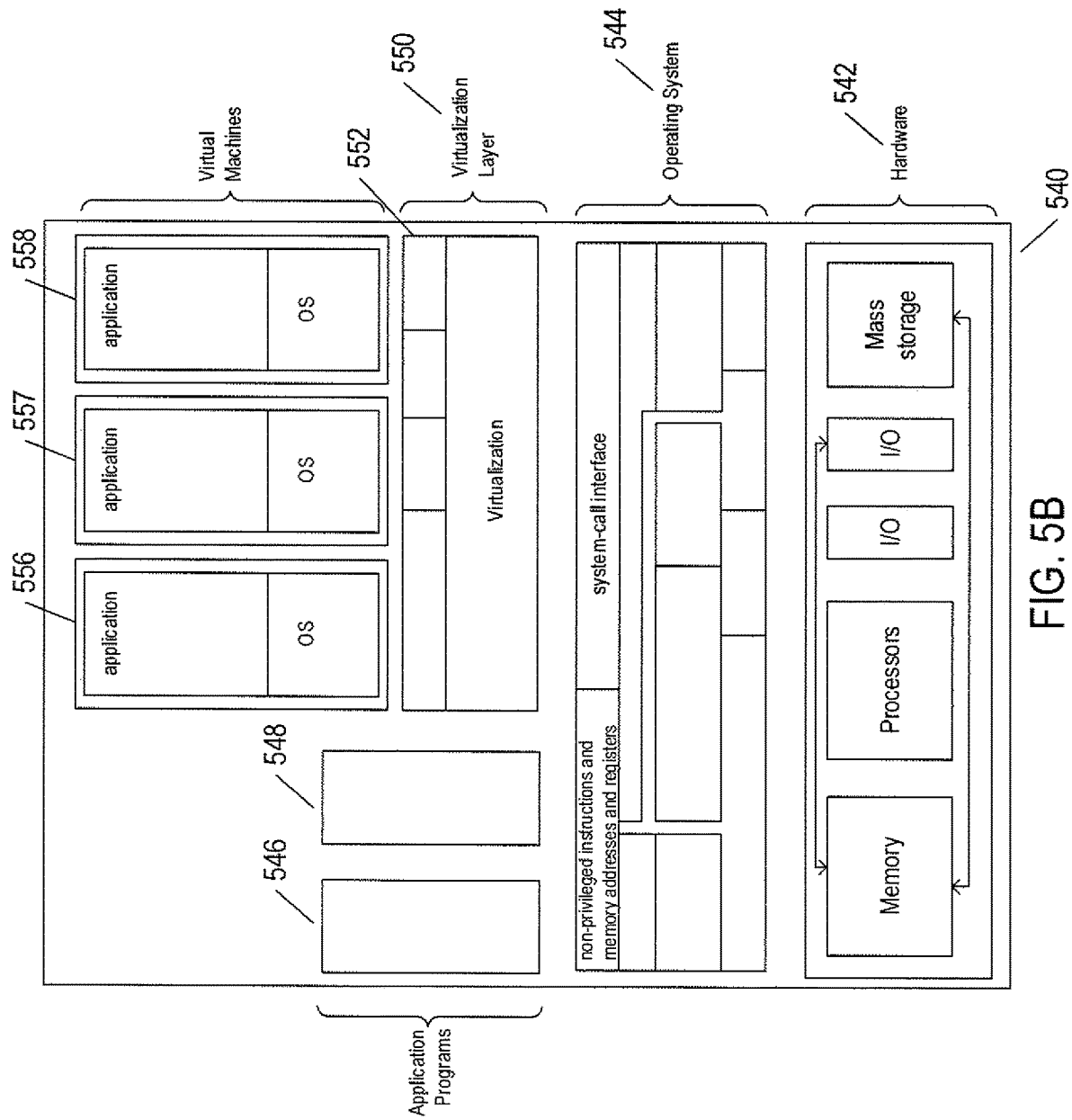

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
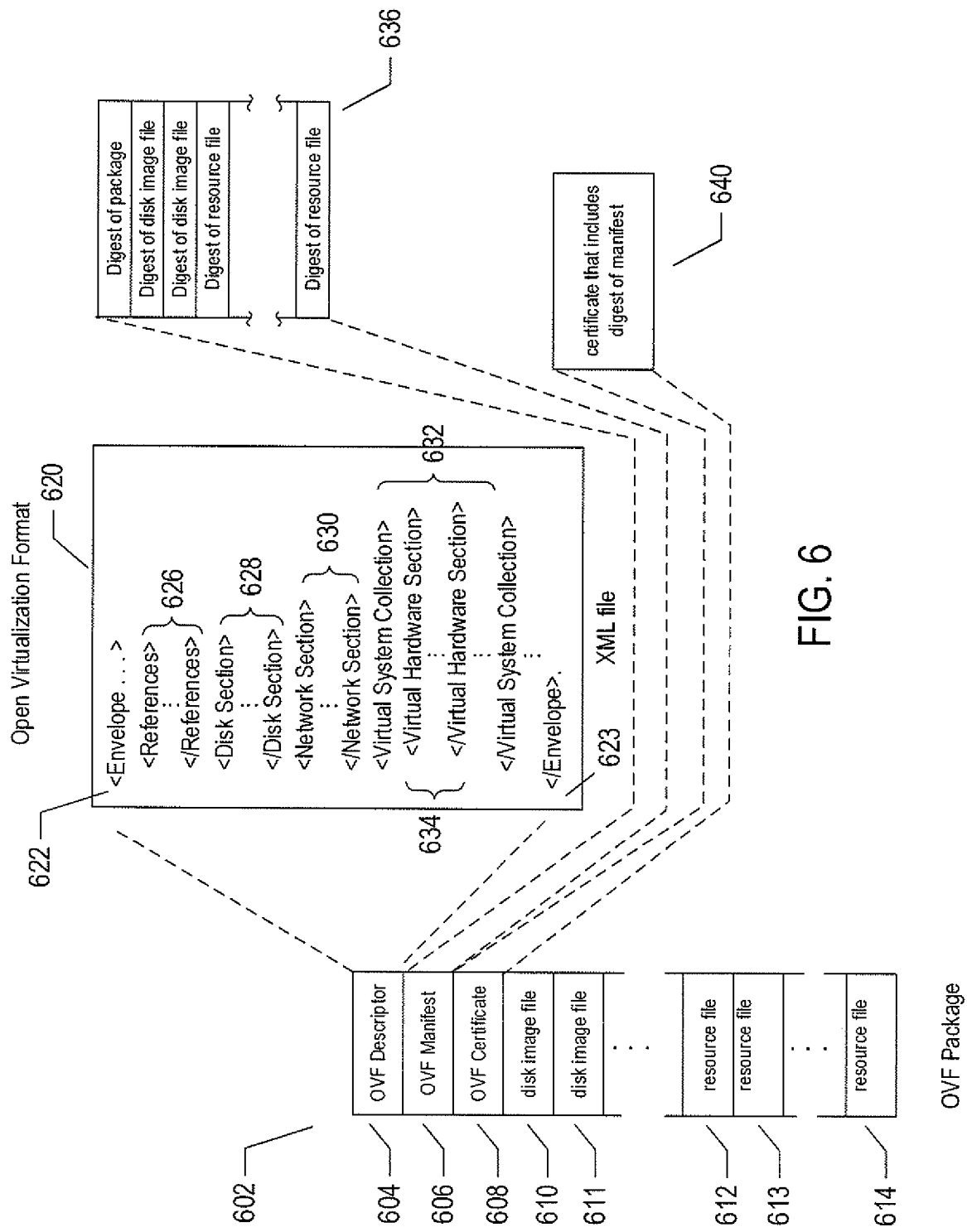
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
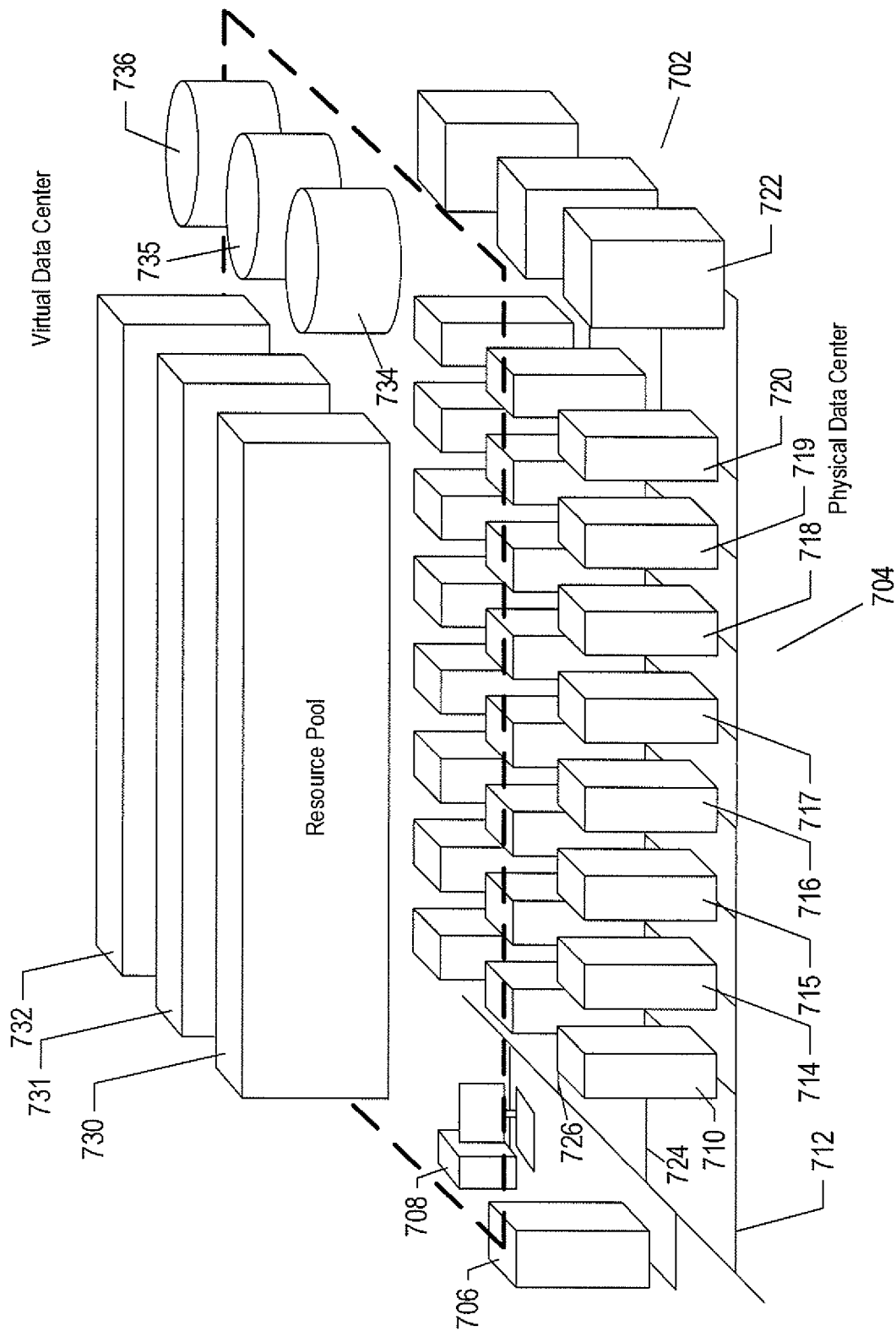
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of various different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
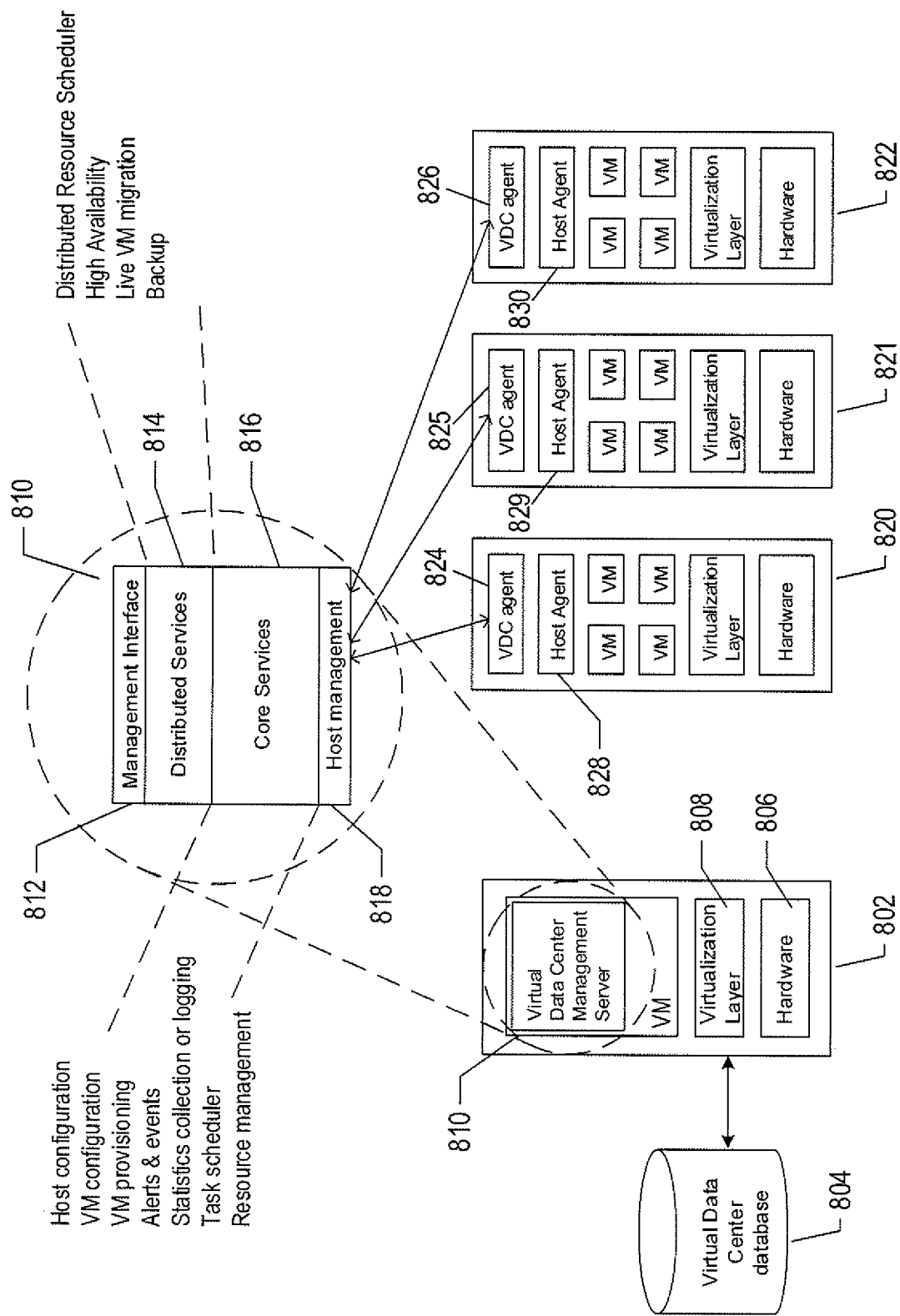
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808, and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
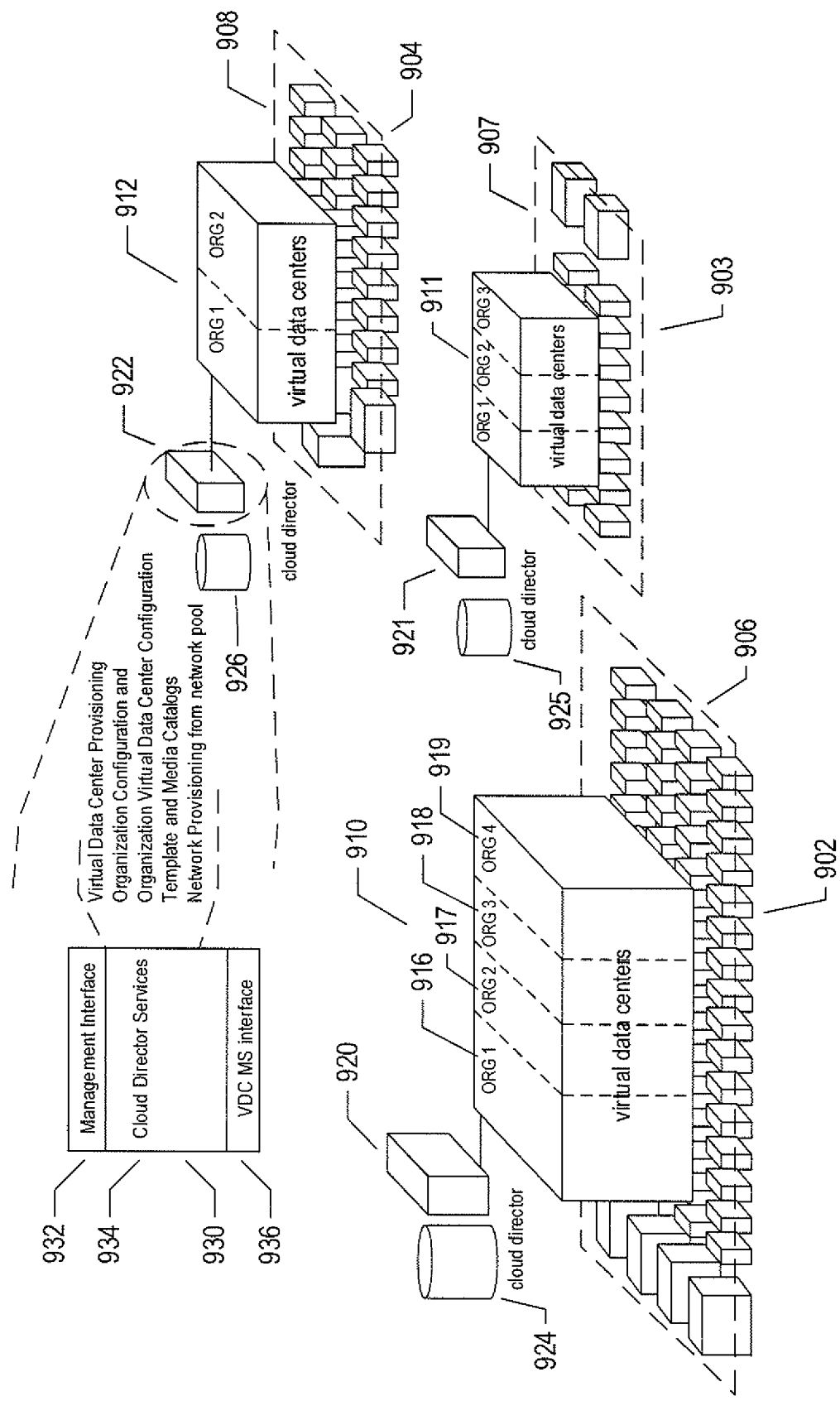
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
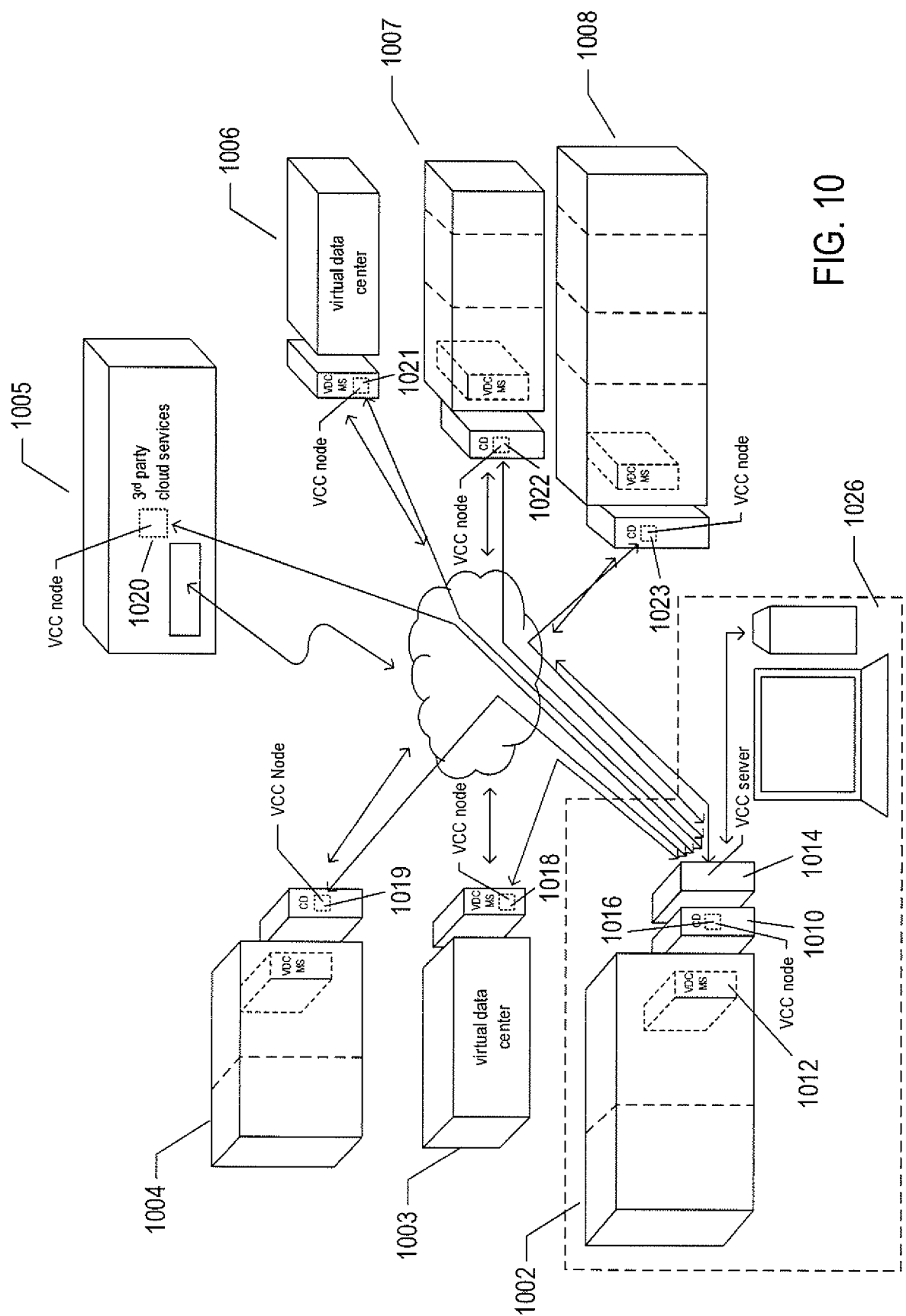
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Containers and Containers Supported by
Virtualization Layers

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
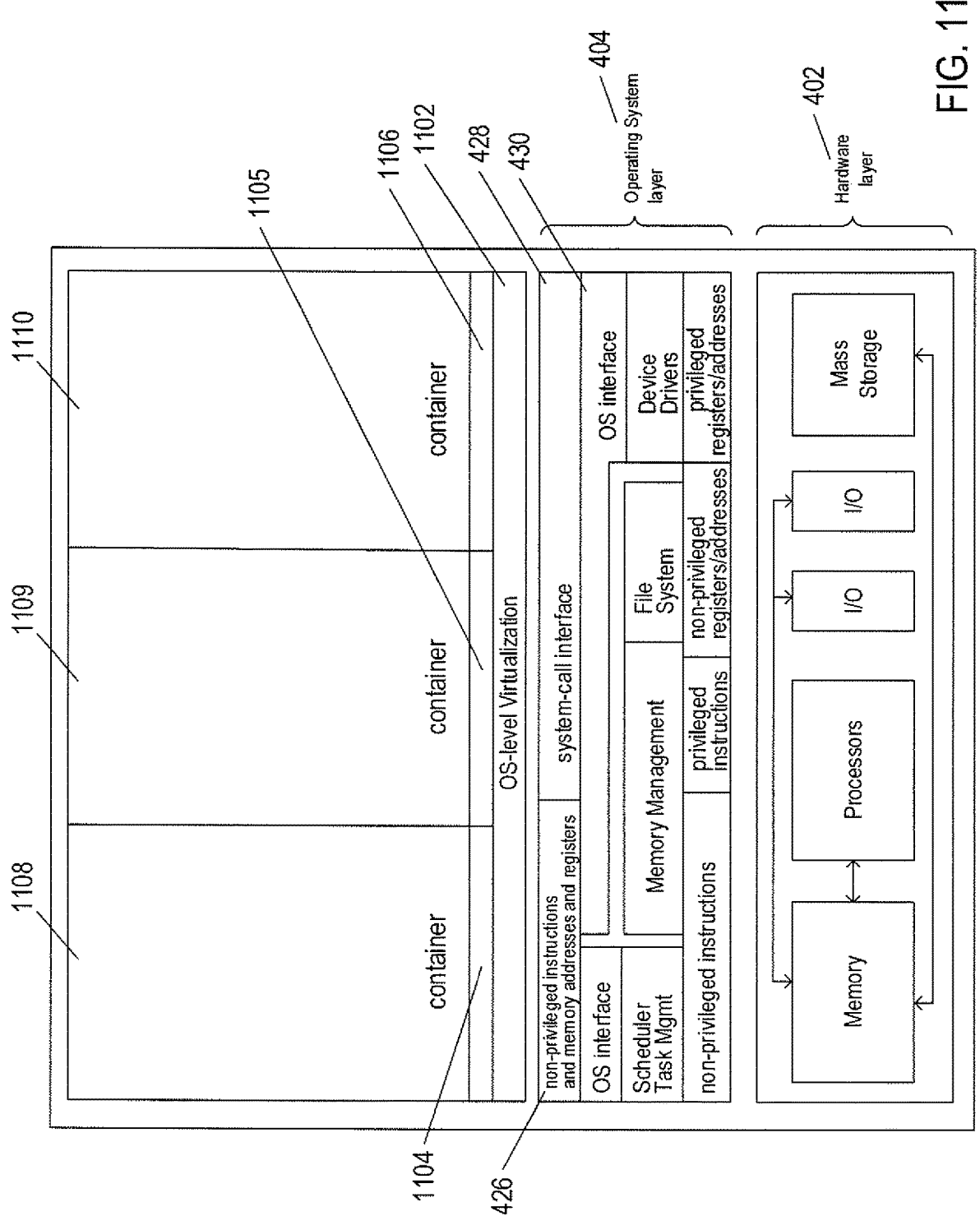
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
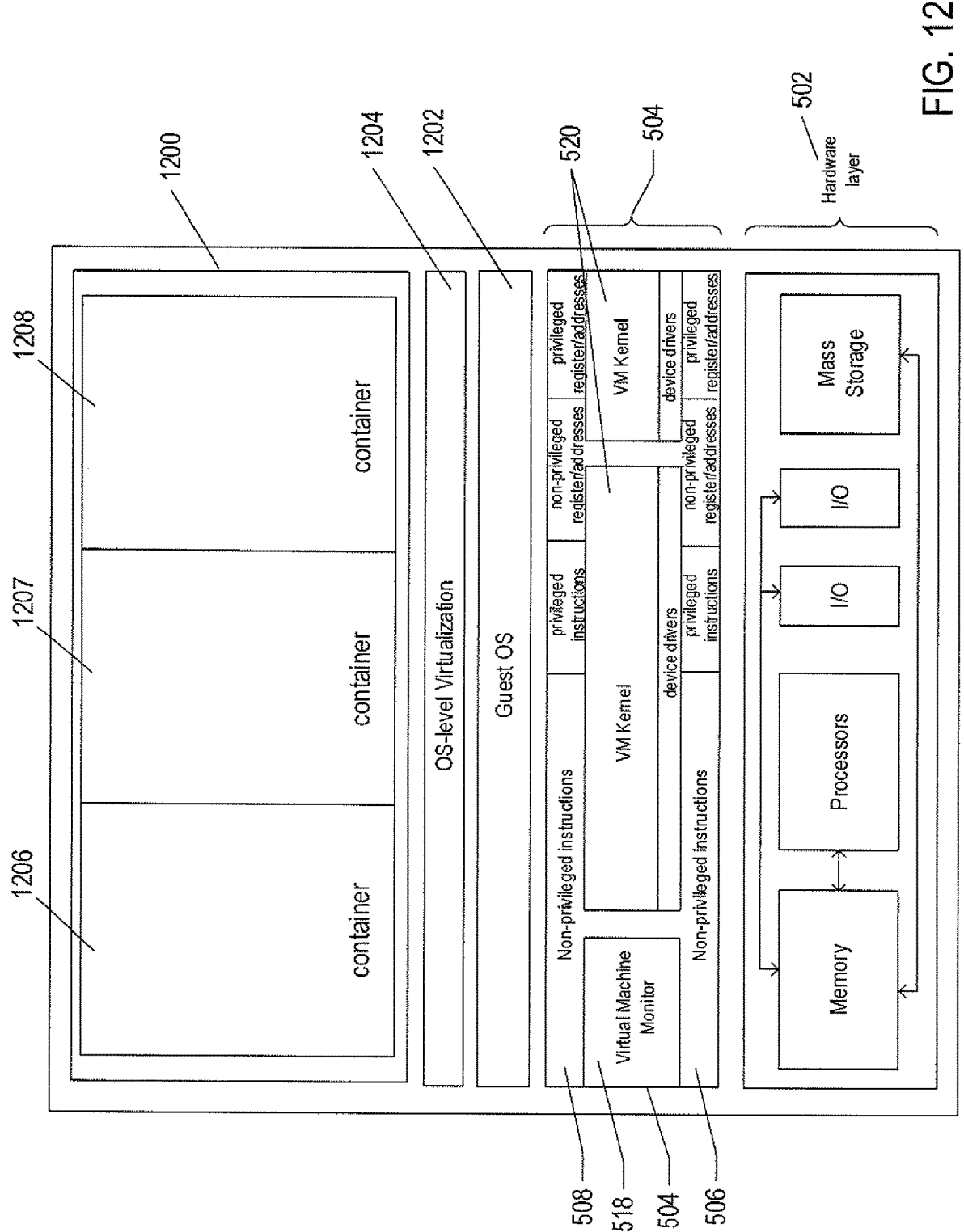
FIG. 12 shows an approach to implementing the containers on a VM.

FIG. 12 shows an approach to implementing the containers on a VM. FIG. 12 shows a host computer similar to that shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Note that, although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Logging Log Messages and Log-Message Files

Figure 13:
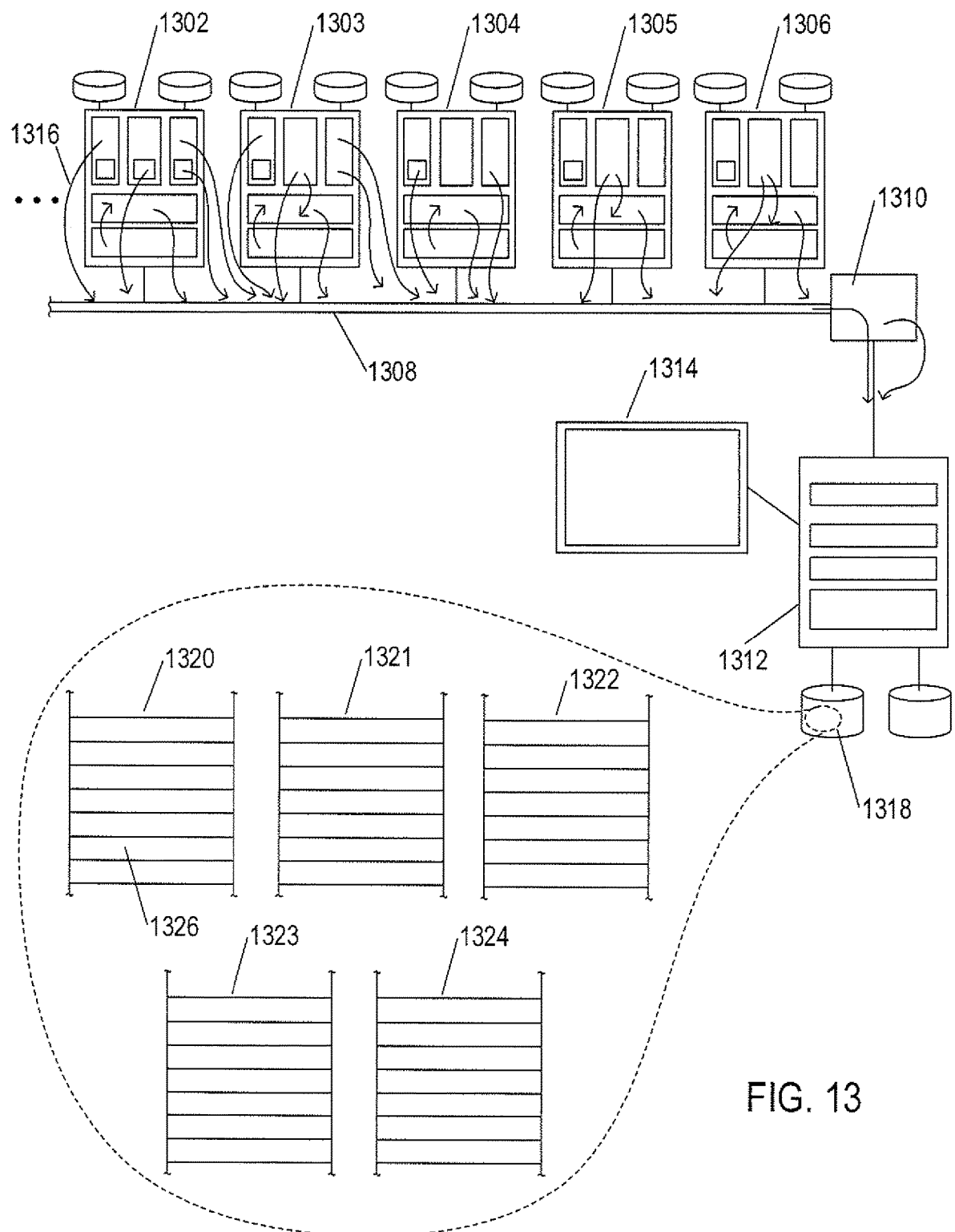
FIG. 13 shows an example of logging log messages in log-message files.

FIG. 13 shows an example of logging log messages in log-message files. In FIG. 13, a number of computer systems 1302-1306 within a distributed computing system are linked together by an electronic communications medium 1308 and additionally linked through a communications bridge/router 1310 to an administration computer system 1312 that includes an administrative console 1314. One or more of the computer systems 1302-1306 may run a log monitoring agent that collects and forwards log messages to a log management server that runs on the administration computer 1312. As indicated by curved arrows, such as curved arrow 1316, multiple components within each of the discrete computer systems 1302-1306 as well as the communications bridge/router 1310 generate log messages that are forwarded to the log management server. Log messages may be generated by any event source. Event sources may be, but are not limited to, application programs, operating systems, VMs, guest operating systems, containers, network devices, machine codes, event channels, and other computer programs or processes running on the computer systems 1302-1306, the bridge/router 1310 and any other components of the distributed computing system. Log messages may be collected at various hierarchical levels within a discrete computer system and then forwarded to the log management server in the administration computer 1312. For example, a log monitoring agent running on one or more of the computer systems 1302-1306 collects and forwards the log messages at various hierarchical levels. The log management server in the administration computer 1312 collects and stores the received log messages in a data-storage device or appliance 1318 as log-message files 1320-1324. Rectangles, such as rectangle 1326, represent individual log messages. For example, log-message file 1320 may comprise a list of log messages generated within the computer system 1302. Each log monitoring agent has an agent monitoring configuration that includes a log path and a log parser. The log path specifies a unique file system path in terms of a directory tree hierarchy that identifies the storage location of a log-message file associated with the event source on the administration computer 1312 or the data-storage device or appliance 1318. The log monitoring agent receives specific file and event channel log paths to monitor log-message files and the log parser includes log parsing rules to extract and format lines of log message into log message fields. The log monitoring agent then sends the constructed structured log messages to the log management server. The administrative computer 1312 and computer systems 1302-1306 can function without log management agents and a log management server, but with less precision and certainty.

Figure 14:
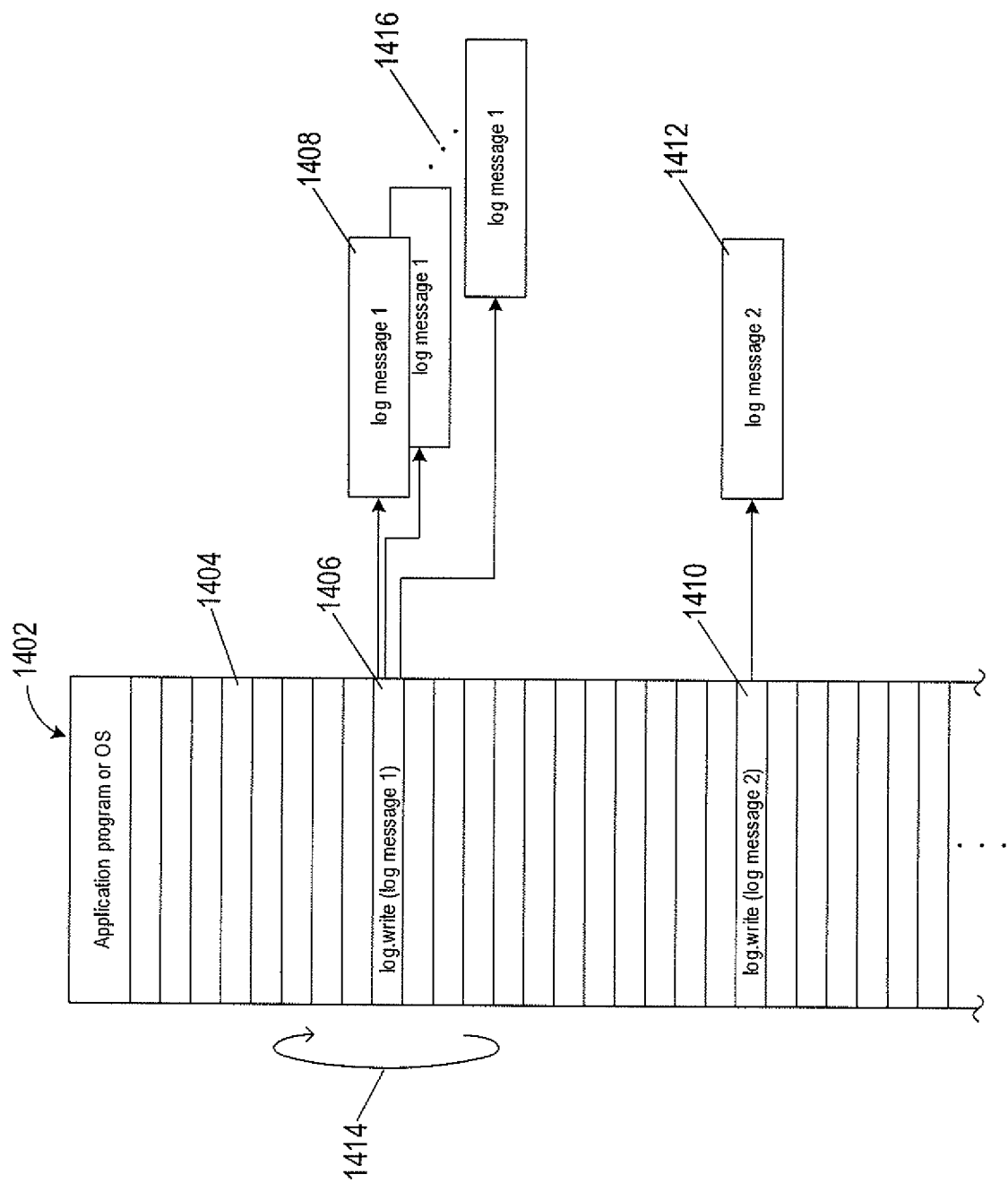
FIG. 14 shows an example of a source code with log write instructions.

FIG. 14 shows an example of a source code 1402 of an application program, an operating system, a virtual machine, a container, a guest operating system, or any other computer program or machine code. The source code 1402 is just one example of an event source that generates log messages. Rectangles, such as rectangle 1404, represent a definition, a comment, a statement, or a computer instruction that expresses some action to be executed by a computer. The source code 1402 includes log write instructions that generate log messages when certain events predetermined by the developer occur during execution of the source code 1402. For example, source code 1402 includes an example log write instruction 1406 that when executed generates an "log message 1" represented by rectangle 1408, and a second example log write instruction 1410 that when executed generates "log message 2" represented by rectangle 1412. In the example of FIG. 14, the log write instruction 1406 is embedded within a set of computer instructions that are repeatedly executed in a loop 1414. As shown in FIG. 14, the same log message 1 is repeatedly generated 1416. The same type of log write instructions may also be located in different places throughout the source code, which in turns creates repeats of essentially the same type of log message in the log-message file.

In FIG. 14, the notation "log.write( )" is a general representation of a log write instruction. In practice, the form of the log write instruction varies for different programming languages. In general, log messages are relatively cryptic, including generally only one or two natural-language words and/or phrases as well as various types of text strings that represent file names, path names, and, perhaps various alphanumeric parameters. In practice, a log write instruction may also include the name of the source of the log message (e.g., name of the application program or operating system and version) and the name of the log-message file to which the log message is to be written. Log write instructions may be written in a source code by the developer of an application program or operating system in order to record events that occur while an operating system or application program is running. For example, a developer may include log write instructions that are executed when certain events occur, such as failures, logins, or errors.

FIG. 15 shows an example of a log write instruction 1502. The log write instruction 1502 includes arguments identified with "$." For example, the log write instruction 1502 includes a time-stamp argument 1504, a thread number argument 1505, and an internet protocol ("IP") address argument 1506. The example log write instruction 1502 also includes text strings and natural-language words and phrases that identify the type of event that triggered the log write instruction, such as the word "repair" 1508. The text strings between brackets "[ ]" represent file-system paths, such as path 1510. When the log write instruction 1502 is executed, parameters are assigned to the arguments and the text strings and natural-language words and phrases are stored as a log message in a log-message file.

FIG. 16 shows an example of a log message 1602 generated by the log write instruction 1502. The arguments of the log write instruction 1502 are assigned numerical parameters that are recorded in the log message 1602 at the time the log message is generated or written to the log-message file. For example, the time stamp 1504, thread 1505, and IP address 1506 of the log write instruction 1502 are assigned corresponding numerical parameters 1604-1606 in the log message 1602. The time stamp 1604, in particular, represents the date and time the log message is generated. The text strings and natural-language words and phrases of the log write instruction 1502 also appear unchanged in the log message 1602 and may be used to identify the type of event that occurred during execution of the application program or operating system.

FIG. 17 shows a small, eight-entry portion of a log-message file 1702. In FIG. 17, each rectangular cell, such as rectangular cell 1704, of the portion of the log-message file 1702 represents a single stored log message. For example, log message 1702 includes a short natural-language phrase 1706, date 1708 and time 1710 numerical parameters, as well as, an alphanumeric parameter 1712 that identifies a particular host computer.

Figure 18:
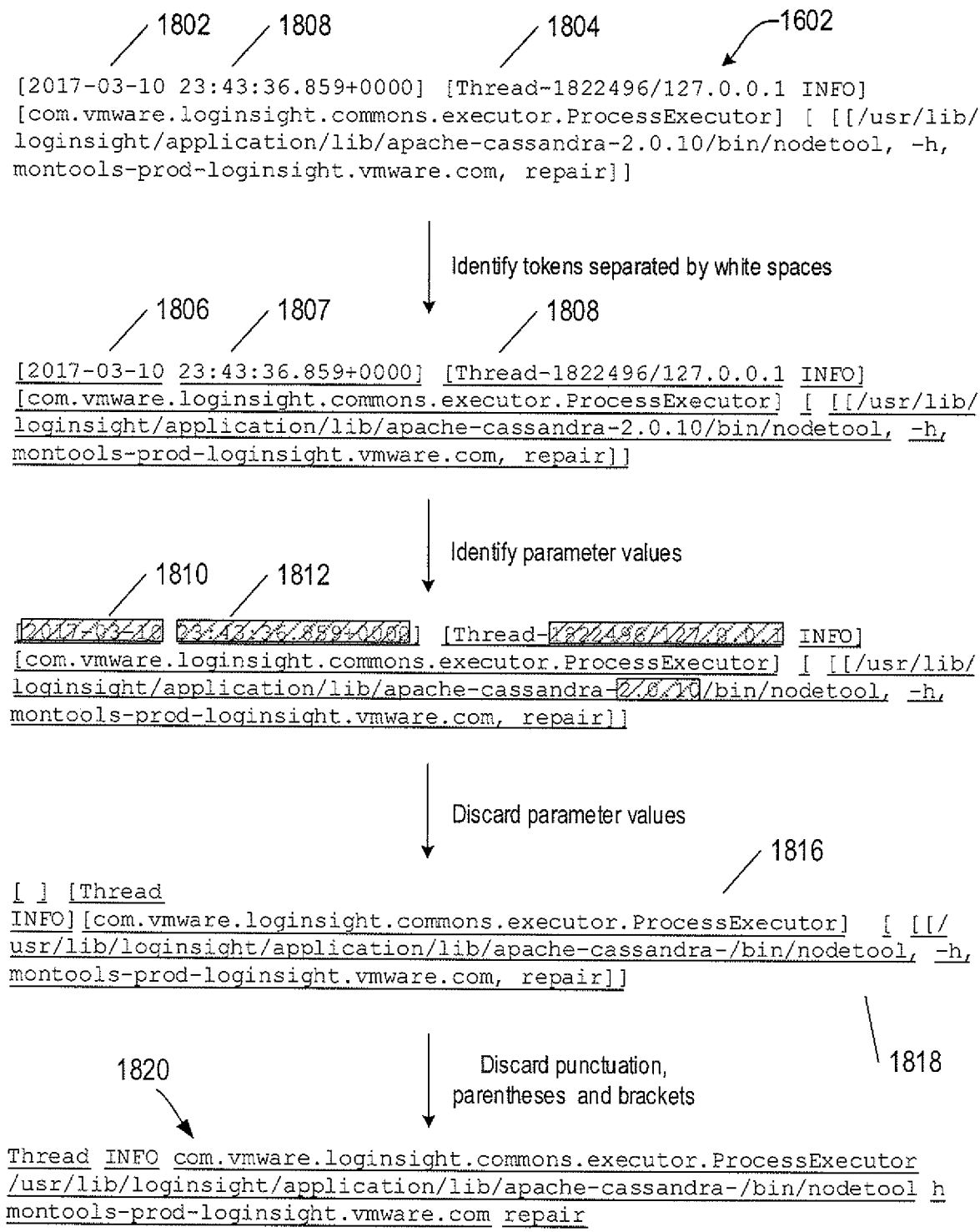
FIG. 18 shows an example of event-type analysis performed on the log message shown in FIG. 16.

FIG. 18 shows an example of event-type analysis performed on the log message 1602 shown in FIG. 16. The log message 1602 is first tokenized by considering the log message as comprising tokens separated by non-printed characters, referred to as "white space." In FIG. 18, this initial tokenization of the log message 1602 is illustrated by underlining of the printed or visible characters. For example, the date 1802, time 1803, and thread 1804 at the beginning of the text contents of the log message 1602, following initial tokenization, become a first token 1806, a second token 1807, and a third token 1808, as indicated by underlining. Next, a token-recognition pass is made to recognize any of the initial tokens as various types of parameters. Parameters are tokens or message fields that are likely to be highly variable over a set of messages of a particular type. Date/time stamps, for example, are nearly unique for each log message, with two log messages having an identical date/time stamp only in the case that the two log messages are generated within less than a second of one another. Additional examples of parameters include global unique identifiers ("GUIDs"), hypertext transfer protocol status values ("HTTP statuses"), universal resource locators ("URLs"), network addresses, and other types of common information entities that identify variable aspects of an event type. By contrast, the word "repair" in log message 1602 likely occurs within each of many repair session log messages. In FIG. 18, the parametric-valued tokens in the log message following initial token recognition are indicated by shading. For example, initial token recognition determines that the first token 1806 is a date and the second token 1807 is a time. The tokens identified as parameters are identified by shaded rectangles, such as shaded rectangle 1810 of the date 1806 and shaded rectangle of 1812 of the time 1807. The parametric-valued tokens are discarded leaving the non-parametric tokens, which are text strings, natural language words and phrases, punctuation, parentheses, and brackets. Various types of symbolically encoded values, including dates, times, machine addresses, network addresses, and other such parameters can be recognized using regular expressions or programmatically. For example, there are numerous ways to represent dates. A program or a set of regular expressions can be used to recognize symbolically encoded dates in any of the common formats. It is possible that the token-recognition process may incorrectly determine that an arbitrary alphanumeric string represents some type of symbolically encoded parameter when, in fact, the alphanumeric string only coincidentally has a form that can be interpreted to be a parameter. The currently described methods and systems do not depend on absolute precision and reliability of the event-message-preparation process. Occasional misinterpretations generally do not result in mistyping of log messages and, in the rare circumstances in which log messages may be mistyped, the mistyping is most often discovered during subsequent processing. In the implementation shown in FIG. 18, the log message 1602 is subject to textualization in which an additional token-recognition step of the non-parametric portions of the log message is performed in order to remove punctuation and separation symbols, such as parentheses and brackets, commas, and dashes that occur as separate tokens or that occur at the leading and trailing extremities of previously recognized non-parametric tokens, as shown by underlining in the retokenized log message 1814 in FIG. 18. For example, brackets and a coma 1818 are underlined. The punctuation, parentheses, and brackets are discarded leaving a textualized log message of interest 1820 that comprises only the non-parametric tokens, including text strings and natural language words and phrases of the original log message 1602. The textualized log message 1820 represents an event type. Other textualized log messages with the same non-parametric text strings and natural language words and phrase as the textualized log messages 1820 are the same event type. Another textualized log message with one or more different non-parametric text strings or natural language words and phrase from those of the textualized log messages 1820 is of a different event type.

Methods and Systems to Manage Alerts

Figure 19A:
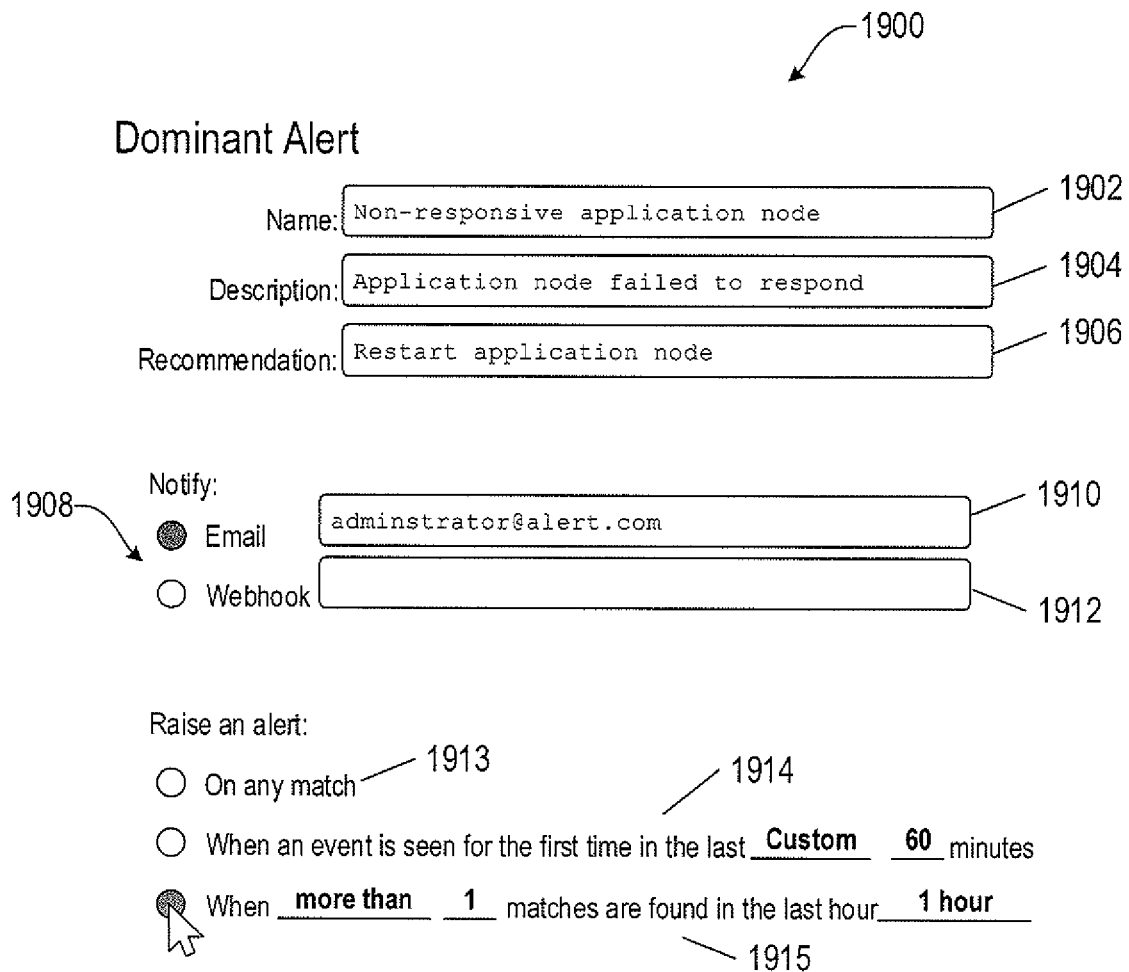
FIG. 19A shows a graphical user interface of a log management server application that enables a user to define a dominant alert.

A log management server described herein enables a user to define clusters of alerts that are represented by a dominant alert or define dominant alerts and subsumed alerts such that the dominant alert is reported and the clusters of alerts or subsumed alerts are suppressed, thereby reducing the number of superfluous alert messages sent to a system administrator. FIG. 19A shows a graphical user interface ("GUI") 1900 of a log management server application that enables a user to define a dominant alert. The GUI 1900 includes a field 1902 for entering the name of an alert message, a field 1904 for entering a description of the problem associated with the alert, and a field 1906 for entering a recommendation for addressing the alert. In the Example of FIG. 19A, the user has named an alert "Non-responsive application node" in field 1902, entered a description of the alert in field 1904, and entered a recommendation to "Restart application node" in field 1906 when the alert arises. The GUI 1900 includes buttons 1908 that enable a user to select the manner in which an alert message is received. When the user selects the "Email" button, the user receives an email message at the email address entered in field 1910. When the user selects the "Webhook" button, the user receives a notification at a web address or uniform resource locator entered in the field 1912. In this example, the user has selected "Email" for receiving notifications and provided an email address in the field 1910. The GUI 1900 enables a user to select from three options represented by buttons for deciding when to raise the alert defined in field 1902. The user may choose to generate an alert message anytime an alert arises 1913, when an event is observed for the first time within a selected time interval (e.g., last 60 minutes) 1914, or when a user selected threshold number of times the event arises within a selected time interval (e.g., last 1 hour) 1915. In the example of FIG. 19A, the user has selected generate an alert that is sent to the email address "administrator@alert.com" when the "Non-responsive application node" arises more than once in the last hour.

Figure 19B:
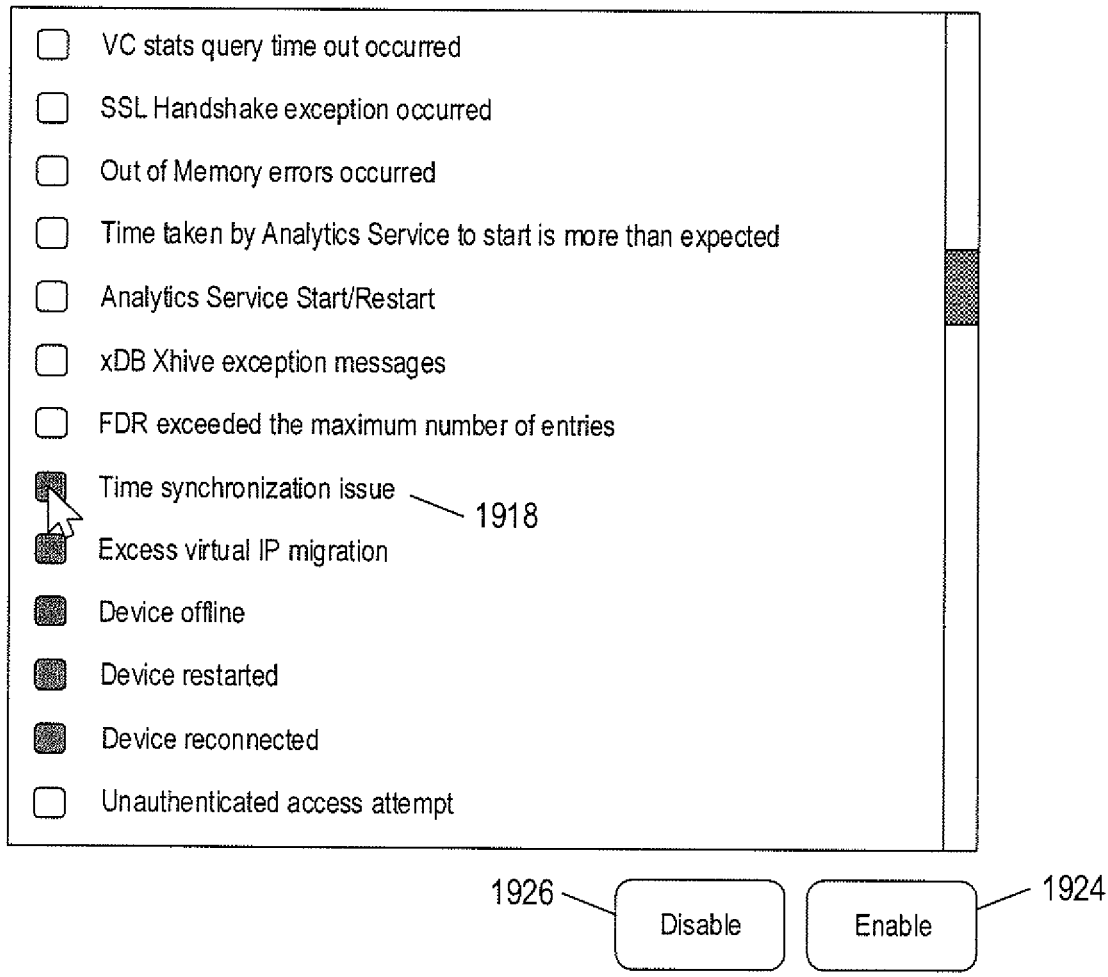
FIG. 19B shows an example of a graphical user interface that displays a list of defined alerts.

The log management server enables the user to form a dominant alert for a cluster of alerts that are subsumed by the dominant alert. FIG. 19B shows an example of a GUI 1916 that displays a list of defined alerts. Each alert has a corresponding set of keywords that are compared with non-parametric tokens of each log message received by the log management server to determine if the log message corresponds to a problem. When non-parametric tokens of a log message match the keywords, the corresponding alert is triggered.

Figure 19C:
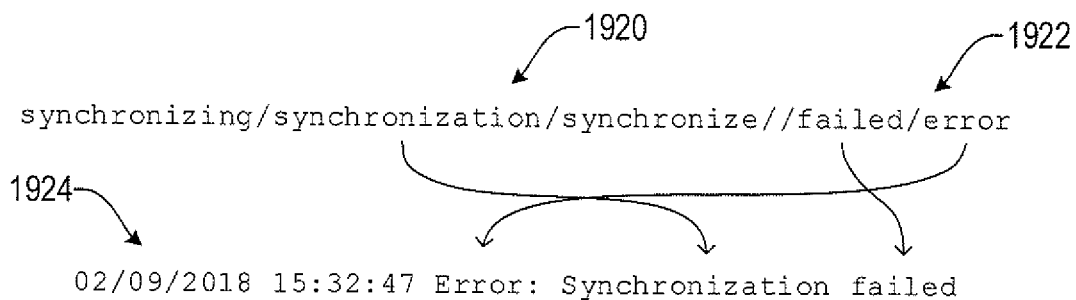
FIG. 19C shows an example of keywords associated with triggering an example alert.

FIG. 19C shows an example of keywords 1920 and 1922 associated with triggering the alert "Time synchronization issue" 1918 in FIG. 19B. When the non-parametric tokens of a log message include at least one of the keywords "synchronizing," "synchronization," or "synchronize" and at least one of the keywords "failed" or "error," the alert "Time synchronization issue" is triggered. In the example of FIG. 19C, a log message 1924 includes the non-parametric tokens "Error," "Synchronization," and "failed." Because at least one of the keywords 1920 and both of the keywords 1922 are present as non-parametric tokens in the log message 1924, the "Time synchronization alert" is triggered and an alert message is sent to the system administrator.

Returning to FIG. 19B, the GUI 1916 enables a user to form a cluster of two or more alerts for the defined alert input in FIG. 19A. The GUI 1916 displays the list of alerts a user may scroll through. Each alert listed in the GUI 1916 is triggered when keywords associated with the alert match non-parametric tokens of one or more log messages. The user selects two or more alerts to form a cluster of alerts by clicking on the boxes located next to each of the alerts. For example, a user has selected five alerts identified by darkened boxes that form a cluster of alerts associated with a dominant alert "Non-responsive application node" entered in FIG. 19A. When the user clicks on the "Enable" button 1924, the selected cluster of alerts is enabled. When the cluster of selected alerts occur within a selected time interval, the alerts that form the selected cluster of alerts are suppressed and the dominant alert "Non-responsive application node" is triggered. On the other hand, if fewer than five of the cluster of alerts are triggered within the selected time interval, an alert message is generated for each of the alerts. When the user clicks on the "Disable" button 1926, the selected cluster of alerts is disabled. In this case, the five alerts would not be suppressed but would instead be generated separately.

Figure 19D:
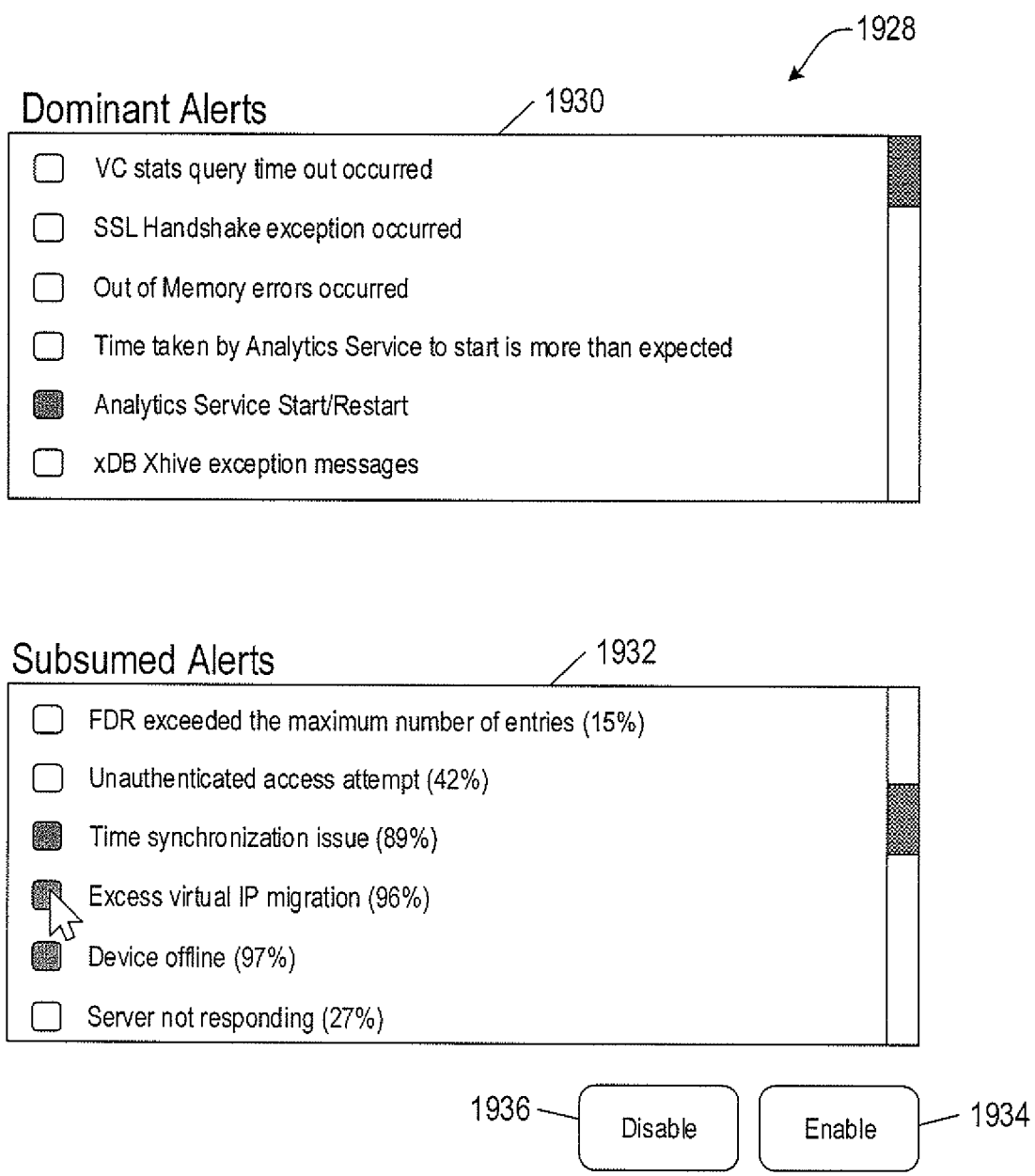
FIG. 19D shows an example of a graphical user interface that enables a user to identify a dominant alert that subsumes one or more alerts.

In an alternative implementation, FIG. 19D shows an example of a GUI 1928 that enables a user to identify a dominant alert that subsumes one or more alerts. Dominant alerts are listed in a first window 1930. Subsumed alerts are listed in a second window 1932. The user selects a dominant alert by clicking on one of the boxes located next to the alerts in the window 1930. The user selects one or more alerts to be subsumed by the dominant alert by clicking on one or more of the boxes located next to the alerts in the window 1932. In the example of FIG. 19D, the user has selected the alert "Analytics Service Start/Restart" as the dominant alert and the alerts "Time synchronization issue," "Excess virtual IP migration," and "Device offline" as the alerts to be subsumed by the dominant alert. When the user clicks on the "Enable" button 1934, the selected dominant and subsumed alerts are enabled. When the selected dominant and subsumed alerts occur within a selected time interval, the dominant alert is generated and the subsumed alerts are not generated. For example, when log messages contain the keywords of the selected alerts in windows 1930 and 1932, only the alert "Analytics Service Start/Restart" is triggered. The selected subsumed alerts in 1932 are suppressed. When the user clicks on the "Disable" button 1936, the dominant and subsumed alerts are trigger separately.

Various event sources can generate log messages that when received and processed by the log management server trigger an alert. When the log management server has been configured to define a dominant alert for one or more event sources, as described above with reference to FIGS. 19A-19D. Log messages received by the log management server 2102 are monitored for specific tokens and non-parametric patterns and a system administrator is notified with an alert if such tokens and pattern occurs more than a specified threshold number of times. A cluster of alerts or subsumed alerts generated in response to problems identified in log messages generated by the event sources are suppressed in favor of generating a dominant alert that is representative of the cluster or subsumed alerts. In the following discussion, the event sources are application nodes of a distributed application. In practice, the event sources can be any combination of applications, distributed application nodes, operating systems, guest operating systems, VMs, or containers running in a distributed computing system.

Figure 20:
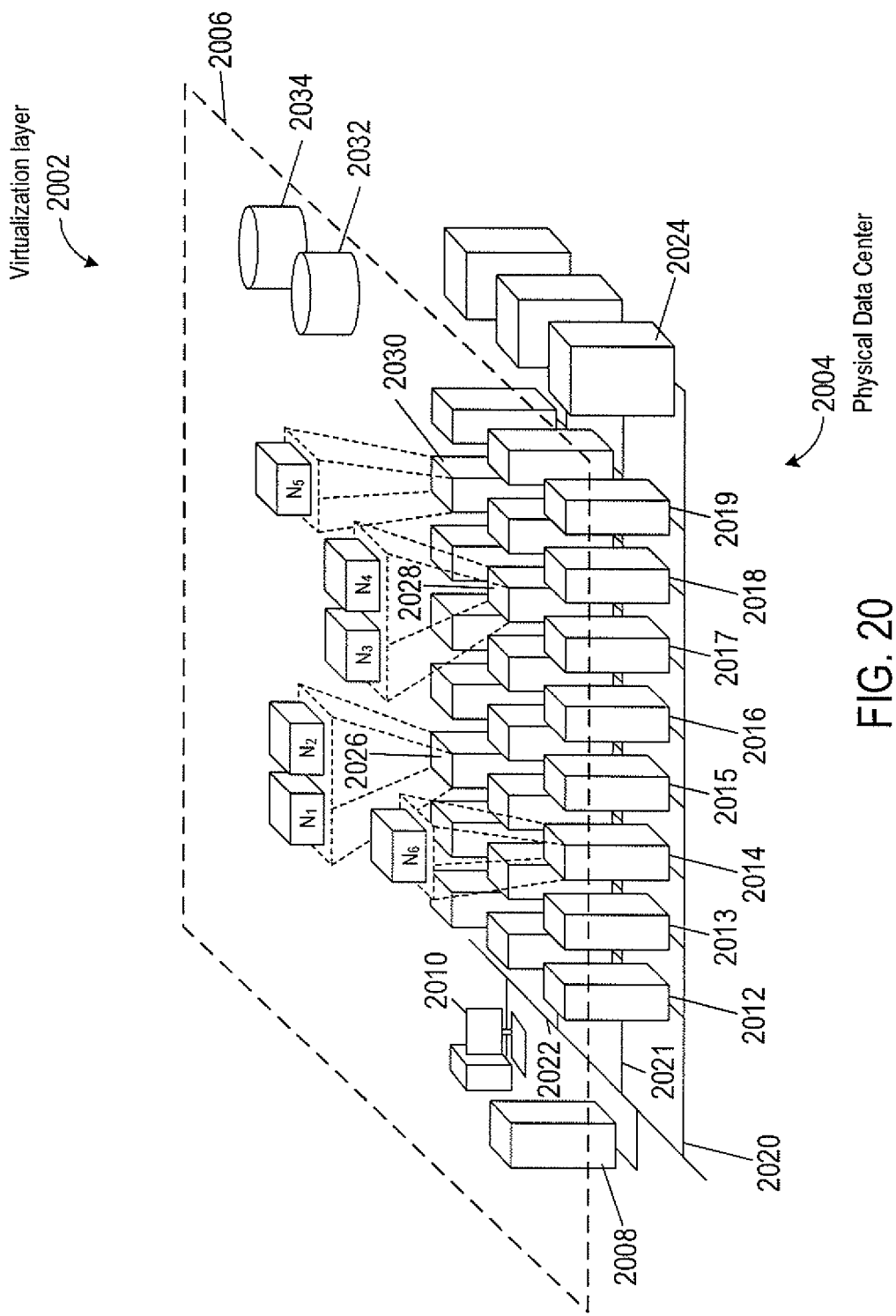
FIG. 20 shows an example of a virtualization layer located above a physical data center.

FIG. 20 shows an example of a virtualization layer 2002 located above a physical data center 2004. The virtualization layer 2002 is separated from the physical data center 2004 by a virtual-interface plane 2006. The physical data center 2004 comprises a management server computer 2008 and any of various computers, such as PC 2010, on which a virtual-data-center management interface may be displayed to system administrators and other users. The physical data center 2004 additionally includes many server computers, such as server computers 2012-2019, that are coupled together by local area networks 2020-2022. Each local area network directly interconnects a bank of eight server computers and a mass-storage array. For example, local area network 2020 directly interconnects server computers 2012-2019 and a mass-storage array 2022. Different physical data centers may be composed of many different types of computers, networks, data-storage systems and devices connected according to many different types of connection topologies.

In the example of FIG. 20, the virtualization layer 2002 comprises six application nodes of a distributed application program. The application nodes are hosted by four server computers and may be run in VMs, containers, or containers in VMs. For example, application nodes $N_1$ and $N_2$ are hosted by server computer 2026. Application nodes $N_3$ and $N_4$ are hosted by server computer 2028. Application node $N_5$ is hosted by server computer 2030. And application node $N_6$ is hosted by server computer 2014. The virtualization layer 2002 includes virtual data stores 2032 and 2034 that may be used by the application nodes to store data.

Figure 21:
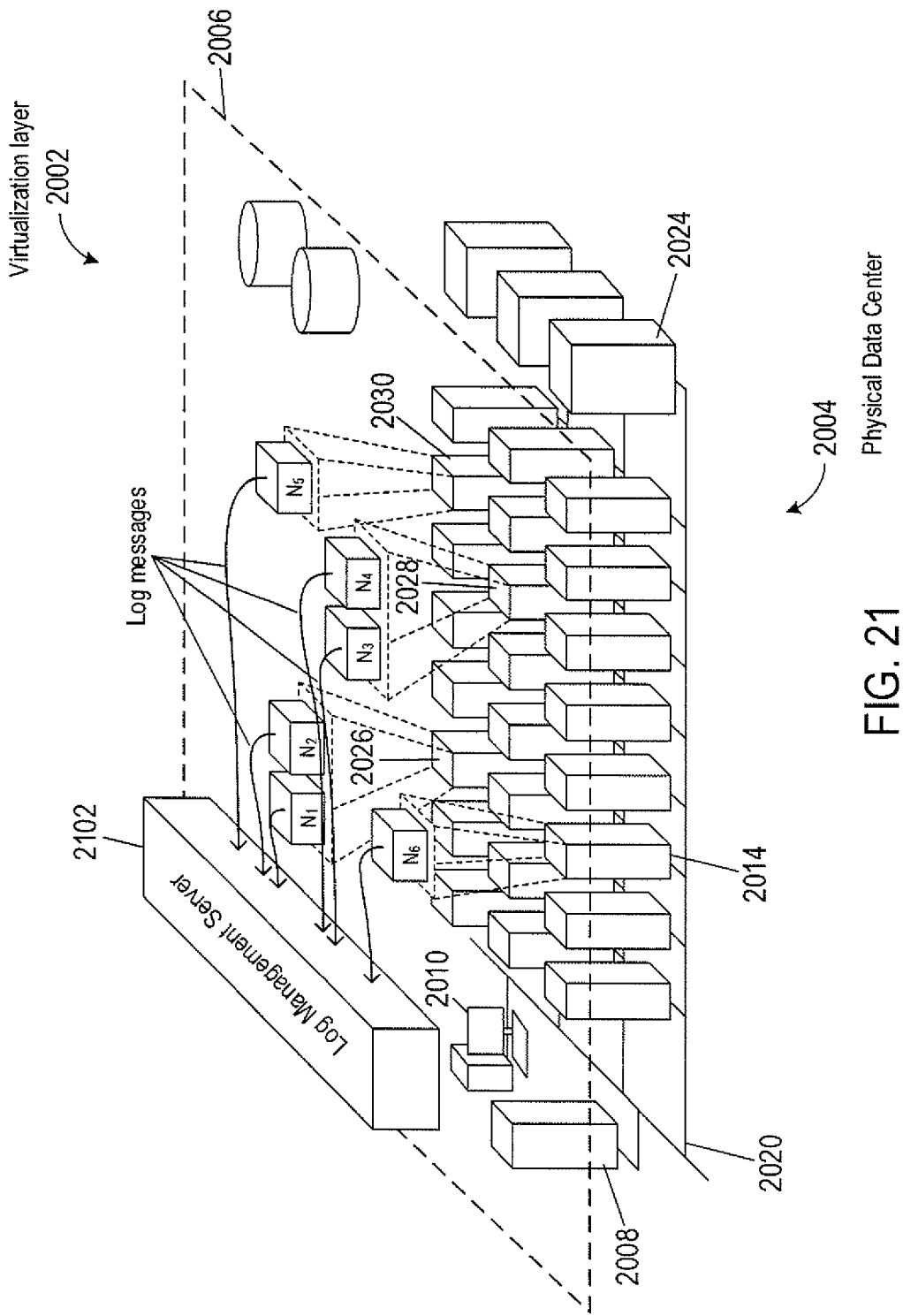
FIG. 21 shows a log management server abstracted to a virtualization layer.

FIG. 21 shows a log management server 2102 abstracted to the virtualization layer 2002. The log management server 2102 is hosted by the management server computer 2008. The log management server 2102 receives log messages sent by log monitoring agents that run on the physical of virtual objects of the distributed computing system 2004 and receives log messages directly from event sources running on physical or virtual objects without log monitoring agents. As shown in FIG. 21, directional arrows represent log messages sent from the application nodes to the log management server 2102.

The networked server computers of the physical data center 2004 enable the application nodes to communicate by passing messages and data between application nodes and coordinate actions for other server applications and server client requests. The log management server 2102 evaluates the contents of the log messages to monitor the behavior of the application nodes, detect problems, generate alerts, and suppresses alerts according to defined cluster alerts and dominant/subsumed alerts described above with reference to FIGS. 19A-19D.

Figure 22:
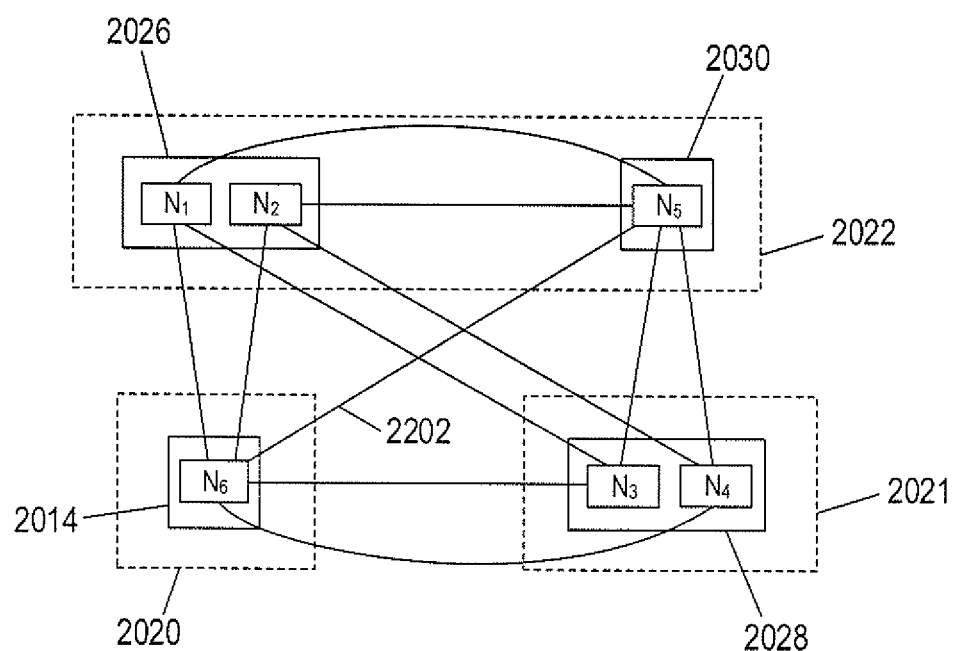
FIG. 22 shows an example of message and data passing between the application nodes of a distributed application.

FIG. 22 shows an example of message and data passing between the application nodes shown in FIG. 20. Boxes 2014, 2026, 2028, and 2030 represent the computer servers 2014, 2026, 2028, and 2030 shown in FIG. 20. Dashed-line boxes 2020-2022 represent the local area networks 2020-2022 shown in FIG. 20. Lines and curves, such as line 2202, represent messages and data passed between application nodes. When a server computer fails, or a local area network becomes overloaded, communications between the application nodes are interrupted. For example, as shown in FIG. 22, suppose the application node $N_6$ freezes which interrupts communications with application nodes $N_1$, $N_2$, $N_3$, $N_4$, and $N_5$. Such an interruption in communications may be the result of insufficient resources of the server computer 2014 used to run the virtual object of application node $N_6$ or the local area network 2020 has reached capacity. The performance problems for each of the application nodes are recorded in log messages that are sent to the log management server 2002. Because the application node $N_6$ also communicates with the other five application nodes, a cascade of performance problems may occur at the other application nodes, which are also recorded in log messages that are sent to the server management server 2102.

The log management server 2102 accesses the log-message files of the distributed application with time stamps in a selected time interval denoted by $[t_i, t_f]$, where $t_i$ is the start of the time interval and $t_f$ is the end of the time interval. The selected time interval may be defined by the user in FIG. 19A. Keywords of each alert are compared with non-parametric tokens of each log message of the log-message file with time stamps in the selected time interval to generate corresponding alerts, as described above with reference to FIG. 19C. Any alerts that are part of a cluster of alerts or have been identified as subsumed alerts are suppressed and the corresponding dominant alert is generated instead.

Figure 23A:
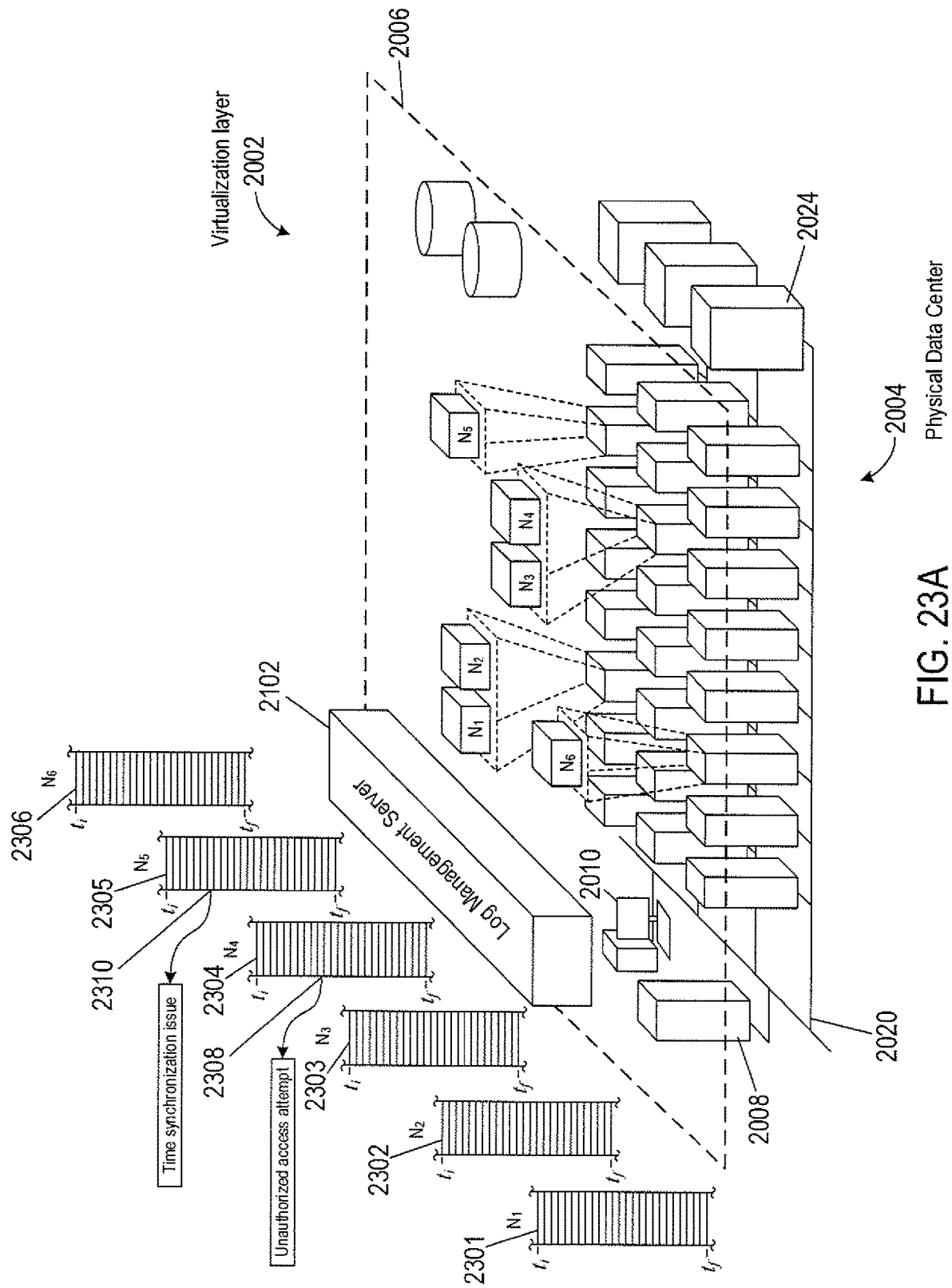
FIG. 23A shows example portions of log-message files generated by the six application nodes within a selected time interval.

FIG. 23A shows example portions of log-message files 2301-2306 generated by the six application nodes $N_1$, $N_2$, $N_3$, $N_4$, $N_5$, and $N_6$ within the selected time interval. In the example of FIG. 23A, only the log-message file 2304 contains a log message 2308 that triggers the alert "Unauthorized access attempt" and the log-message file 2305 contains a log message 2310 that triggers the alert "Error: Synchronization failed." A system administrator may have previously observed this combination of alerts in the past and determined that when the alert "Unauthorized access attempt" accompanies the alert "Time synchronization issue" within the selected time interval, the problem that creates the "Time synchronization issue" alert subsequently creates the problem that leads to the "Unauthorized access attempt" and that both problems are remedied by restarting the application node with the time synchronization issue. Using the GUI 1928, the system administrator identifies the alert associated with the "Time synchronization issue" as the dominant alert and the alert associated with the "Unauthorized access attempt" as the subsumed alert. As a result, when the alert for the "Time synchronization issue" and the alert for the "Unauthorized access attempt" are generated within the user-selected time interval, the alert for the "Unauthorized access attempt" is suppressed and an alert message for the "Time synchronization issue" is generated.

FIG. 23B shows an example of an alert message 2312 generated by the log management server 2102. In this example, the alert message 2312 is sent to the system administrator's email address. The alert message provides an explanation of the issue and a recommendation for remedial action to correct the issue. In this example, a separate alert message is not generated for the alert "Unauthorized access attempt."

Figure 24A:
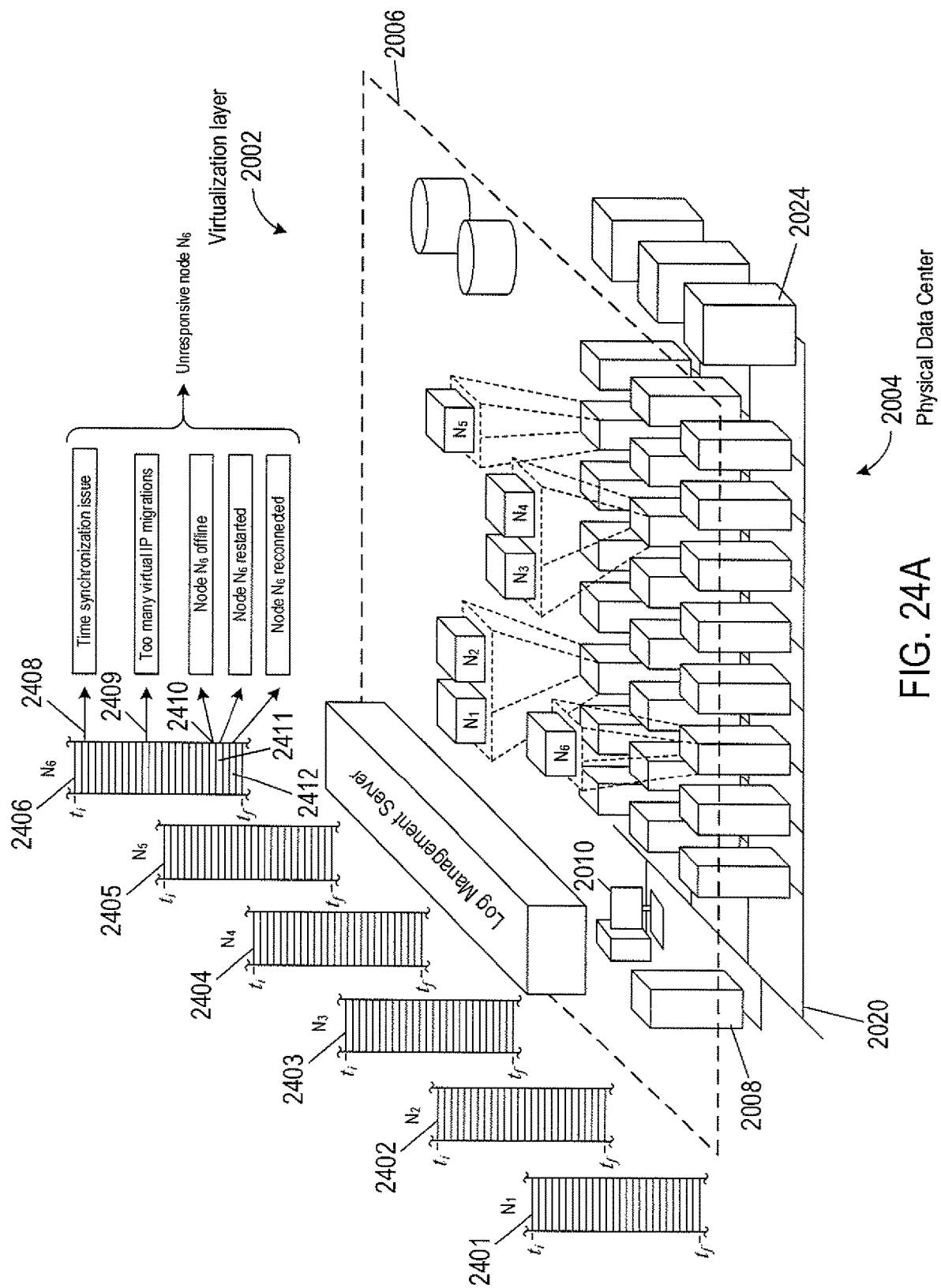
FIG. 24A shows example portions of log-message files generated by the six application nodes within a selected time interval.

FIG. 24A shows example portions of log-message files 2401-2406 generated by the six application nodes $N_1$, $N_2$, $N_3$, $N_4$, $N_5$, and $N_6$ within the user-selected time interval. In the example of FIG. 24A, the log-message file 2406 contains five log messages 2408-2412 that alone trigger corresponding alerts "Time synchronization issue," "Too many virtual IP migrations," "Node $N_6$ offline," "Node $N_6$ restarted," and "Node $N_6$ reconnected." In this example, a system administrator may have previously observed this combination of alerts generated by an application node in the past within the selected time interval is an indication of a non-responsive node. Using the GUI 1916, the system administrator creates the cluster of alerts shown in FIG. 19B to create the dominant alert "Unresponsive application node." As a result, when the alerts "Time synchronization issue," "Too many virtual IP migrations," "Node $N_6$ offline," "Node $N_6$ restarted," and "Node $N_6$ reconnected" are generated within the selected time interval, these alerts are suppressed and the alert message for "Unresponsive application node" is generated.

FIG. 24B shows an example of an alert message 2414 generated by the log management server 2102. In this example, the alert message 2414 is sent to the system administrator's email address. The alert message provides an explanation of the issue and a recommendation for remedial action to correct the issue. In this example, separate alerts messages are not generated for the alerts "Time synchronization issue," "Too many virtual IP migrations," "Node $N_6$ offline," "Node $N_6$ restarted," and "Node $N_6$ reconnected."

Figure 25A:
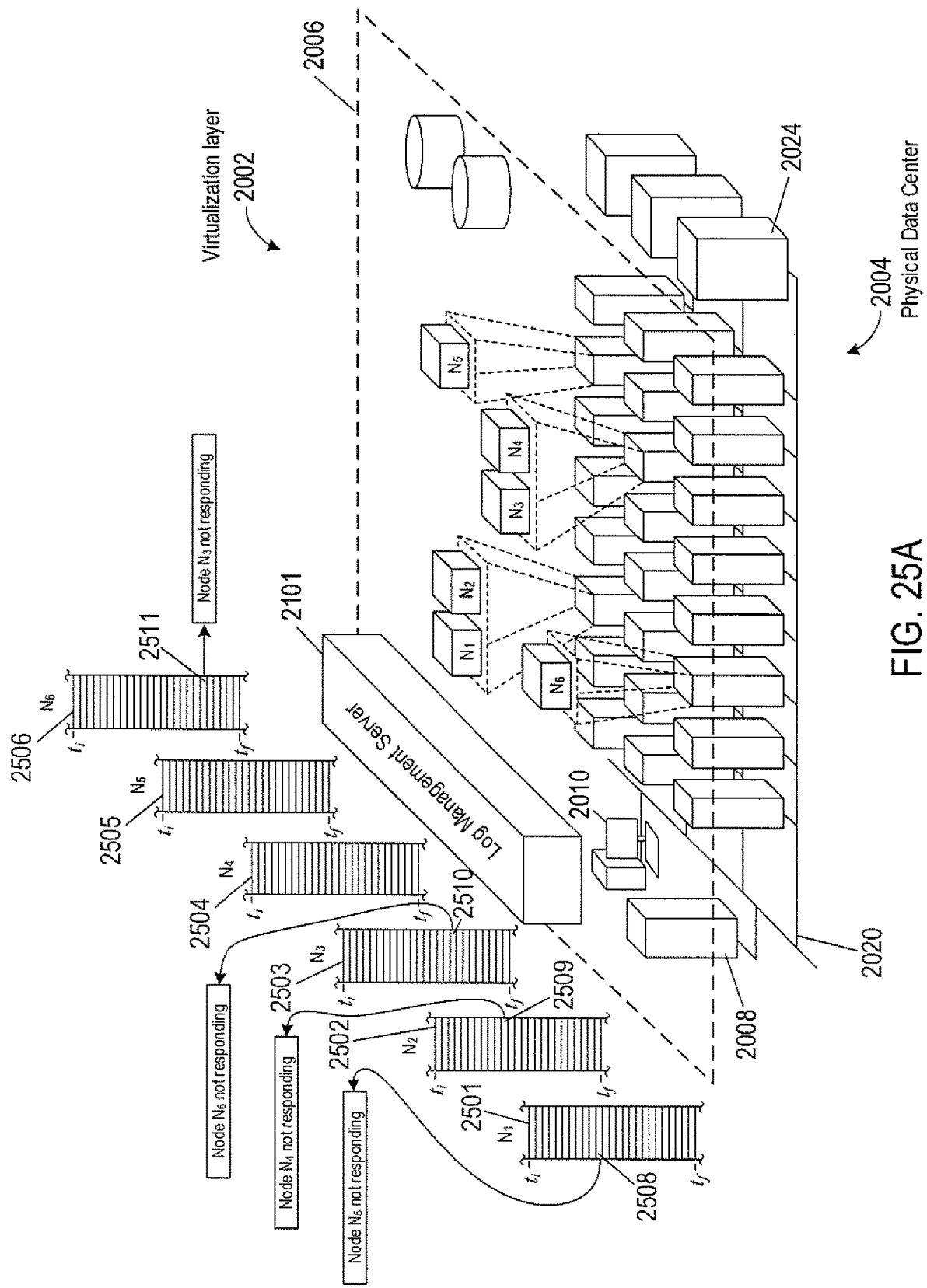
FIG. 25A shows example portions of log-message files generated by the six application nodes within a selected time interval.

FIG. 25A shows example portions of log-message files 2501-2506 generated by the six application nodes $N_1$, $N_2$, $N_3$, $N_4$, $N_5$, and $N_6$ within the user-selected time interval. In the example of FIG. 25A, the log-message files 2501-2503 and 2506 contain five similar log messages five log messages 2508-2511 that trigger corresponding alerts "Node $N_5$ not responding," "Node $N_4$ not responding," "Node $N_6$ not responding," and "Node $N_3$ not responding." In this example, a system administrator may have previously observed that combination of alerts generated by an application node in the past within the selected time interval corresponds to a network issue. Using the GUIs 1900 and 1916, the system administrator creates a dominant alert "Network failure" by selecting "Device offline" in GUI 1916 and in GUI 1900 selecting more than one matches in the selected time interval. As a result, when the alerts "Node $N_5$ not responding," "Node $N_a$ not responding," "Node $N_6$ not responding," and "Node $N_3$ not responding" are generated within the user-selected time interval, these alerts are suppressed and a single alert message for "Network failure" is generated.

FIG. 25B shows an example of an alert message 2512 generated by the log management server 2102. In this example, the alert message 2512 is sent to the system administrator's email address. The alert message provides an explanation of the issue and a recommendation for remedial action to correct the issue. In this example, separate alerts messages are not generated for the alerts "Node $N_5$ not responding," "Node $N_4$ not responding," "Node $N_6$ not responding," and "Node $N_3$ not responding."

In the examples described above, a user or system administrator defines a dominant alert and subsumed alerts. The dominant alert is triggered in place of the subsumed alerts. In other implementations, methods and systems automatically create a record of relative alert triggering history and enable a user or system administrator to define dominant and subsumed alert relationships based on the relative alert triggering history. The log management server identifies non-parametric tokens of each log message of one or more log-message files produced by one or more event sources and compares the non-parametric tokens with keywords that define various alerts. Each type of alert has a corresponding alert count that is incremented when a log message of the one or more log-message files is identified as describing the alert. Let $C(A_i)$ represent an alert count of the number of times an alert denoted by $A_i$ is recorded in the one or more log-message files. Co-occurring alerts are counted as the number of times a pair of alerts are recorded in separate log messages within a sliding time window. Let $C(A_i|A_j)$ represent a relative alert count of the number of times an alert denoted by $A_j$ is recorded in one or more log-message files after the alert $A_i$ is recorded in a log-message file within time limits of a sliding time window.

Figures 26A, 26B, 26C:
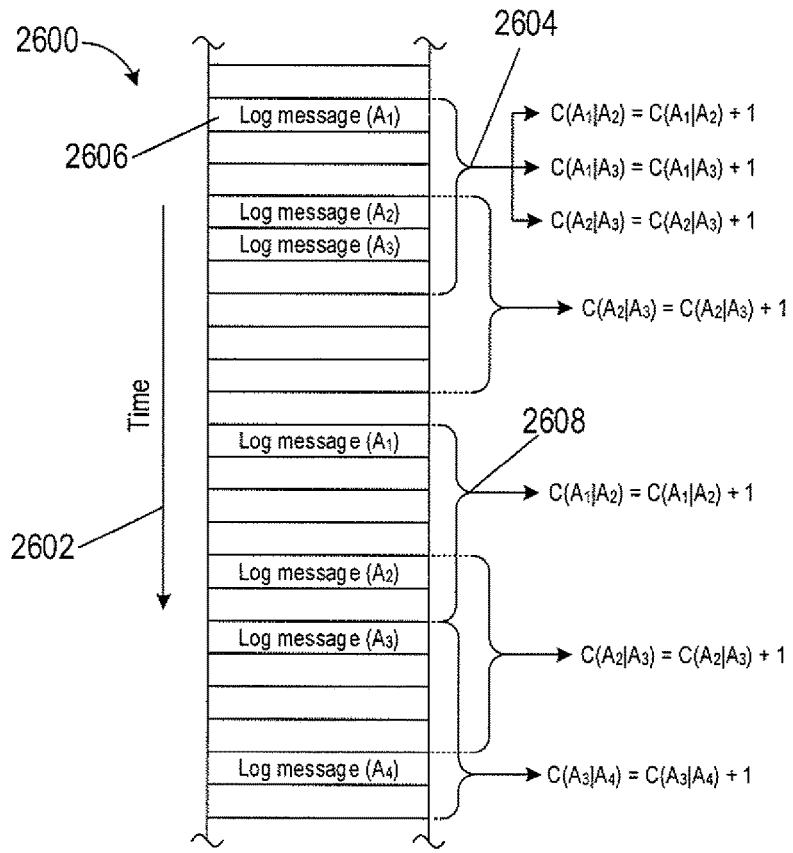
FIG. 26A shows a portion of a log-message file with four types of alerts recorded in alert log messages.
FIG. 26B-26C show example matrices of relative alert counts and relative fractions, respectively, recorded by a log management server.

FIG. 26A shows a portion of a log-message file 2600 with four types of alerts recorded in alert log messages denoted by "Log message $(A_i)$." Directional arrow 2602 represents increasing time. The number of each type of alert recorded in the log messages are counted. For example, the count of the number of times the alert $A_1$ is recorded in log messages of the portion of the log-message file 2600 is $C(A_1)=2$. Brackets, such as bracket 2604, represent the location and time limits of a sliding time window. The duration of the sliding time window may be 30 seconds, 1 minute, 2 minutes, 5 minutes, or any suitable duration. As shown in FIG. 26A, each time the sliding time window it moved, the sliding time window begins at a time stamp of an alert log message. Relative counts of co-occurring log messages that record alerts within the sliding time window are incremented. For example, sliding time window 2604 begins with the alert log message 2606. The relative alert count $C(A_1|A_2)$ is incremented for the location 2604 of the sliding time window and represents the current number of times the alert $A_2$ is recorded in a log message after the alert $A_1$ is recorded in a log message within the duration of the sliding time window. In other words, recording of the alert $A_1$ in an alert log message precedes recording the alert $A_2$ in an alert log message within the sliding time window. When the sliding time window is at the location 2608, the relative alert count $C(A_1|A_2)$ is incremented again because the alert $A_2$ is recorded in a log message after the alert $A_1$ is recorded in a log message within the duration of the sliding time window.

FIG. 26B shows an example matrix of alert counts located along a diagonal and relative alert counts for each pair of alerts located in off-diagonal elements for N different alerts recorded by a log management server. The matrix may not be symmetrical. In other words, relative alert count $C(A_i|A_j)$ does not necessarily equal relative alert count $C(A_j|A_i)$.

A relative fraction of the number of times an alert $A_j$ has been recorded in a log message after an alert $A_i$ has been recorded in a log message within the time limits of the sliding time interval is given by:

$$P(A_i \mid A_j) = \frac{C(A_i \mid A_j)}{C(A_i)} \quad (1)$$

FIG. 26C shows an example matrix of relative fractions of alerts for N different alerts recorded by a log management server. The matrix is a non-symmetric matrix in that relative fraction $P(A_i|A_j)$ may not be equal to the relative fraction $P(A_j|A_i)$.

Returning to FIG. 19D, in certain implementations, when a dominant alert, such as dominant alert "Analytics Service Start/Restart," is selected in the window 1930 of FIG. 19D, a percentage of the time (i.e., $100 \times P(A_i|A_j)$) each alert listed in the subsumed alert window 1932 has been generated within a sliding time window after the dominant alert is displayed next to the alerts. For example, the alert "Time synchronization issue" occurs 89% of the time in the sliding time interval that begins when the alert "Analytics Service Start/Restart" is triggered. By contrast, the alert "FDR exceeded the maximum number of entries" occurs only 15% of the time in the sliding time interval after the alert "Analytics Service Start/Restart" is triggered. As shown in window 1932, the user may select subsumed alerts that are most frequently triggered following the occurrence of a selected dominant alert. When a different dominant alert is selected in the window 1930, the percentages are changed to represents the relative fractions between the dominant alert and the subsumed alerts.

In other implementations, methods and systems automatically identify dominant and subsumed alerts and suppress subsumed alerts based on an alert threshold. The log management server uses the relative fractions to define dominant and subsumed alerts. When the following condition is satisfied for two co-occurring alerts $A_i$ and $A_j$:

$$P(A_i \mid A_j) > Th_{Alert} \quad (2)$$

where $Th_{Alert}$ is an alert threshold, the alert $A_i$ is identified as a dominant alert and the alert $A_j$ is identified as a subsumed alert. Each the time alert $A_j$ is triggered within the duration of the sliding time window after the alert $A_i$ has been triggered, the alert $A_i$ is automatically generated and the alert $A_j$ is suppressed. For example, suppose an alert $A_2$ is triggered $P(A_3|A_2)=0.547$ fraction of the time within a sliding time interval that begins when an alert $A_3$ is triggered. On the other hand, suppose the alert $A_3$ is triggered $P(A_2|A_3)=0.97$ fraction of the time within the sliding time interval that begins when an alert $A_2$ is triggered. When the threshold is $Th_{Alert}=0.90$, the alert $A_2$ is automatically identified as a dominant alert and the alert $A_3$ is subsumed by the alert $A_3$. On the other hand, the alert $A_2$ is not subsumed by the alert $A_3$ because the relative fraction $P(A_3|A_2)$ is less than the alert threshold.

Certain dominant alerts may correspond to a set of computer or machine instructions that are automatically executed by the log management server 2102, or by another server, when a dominant alert is detected. For example, problems associated with certain dominant alerts can be resolved by, for example, restarting routers to remedy a network failure represented by a dominant alert, restarting an application node or VM when the dominant alert indicates the application node or VM are not responding, and restarting server computers when the dominant alert indicates event sources have slowed. VMs and containers may be migrated when a dominant alert indicates that the resources of the server computers the VMs and containers have been running on are longer adequate to support the VMs and containers. Other dominant alerts may be an indication that resources used by an application, application node, VM or container are inadequate, which triggers a re-allocation of server computer resources in response to the dominant alert.

The methods described below with reference to FIGS. 27-32 are stored in one or more data-storage devices as machine-readable instructions that when executed by one or more processors of the computer system shown in FIG. 2 to detect abnormal behavior of an event sources.

Figure 27:
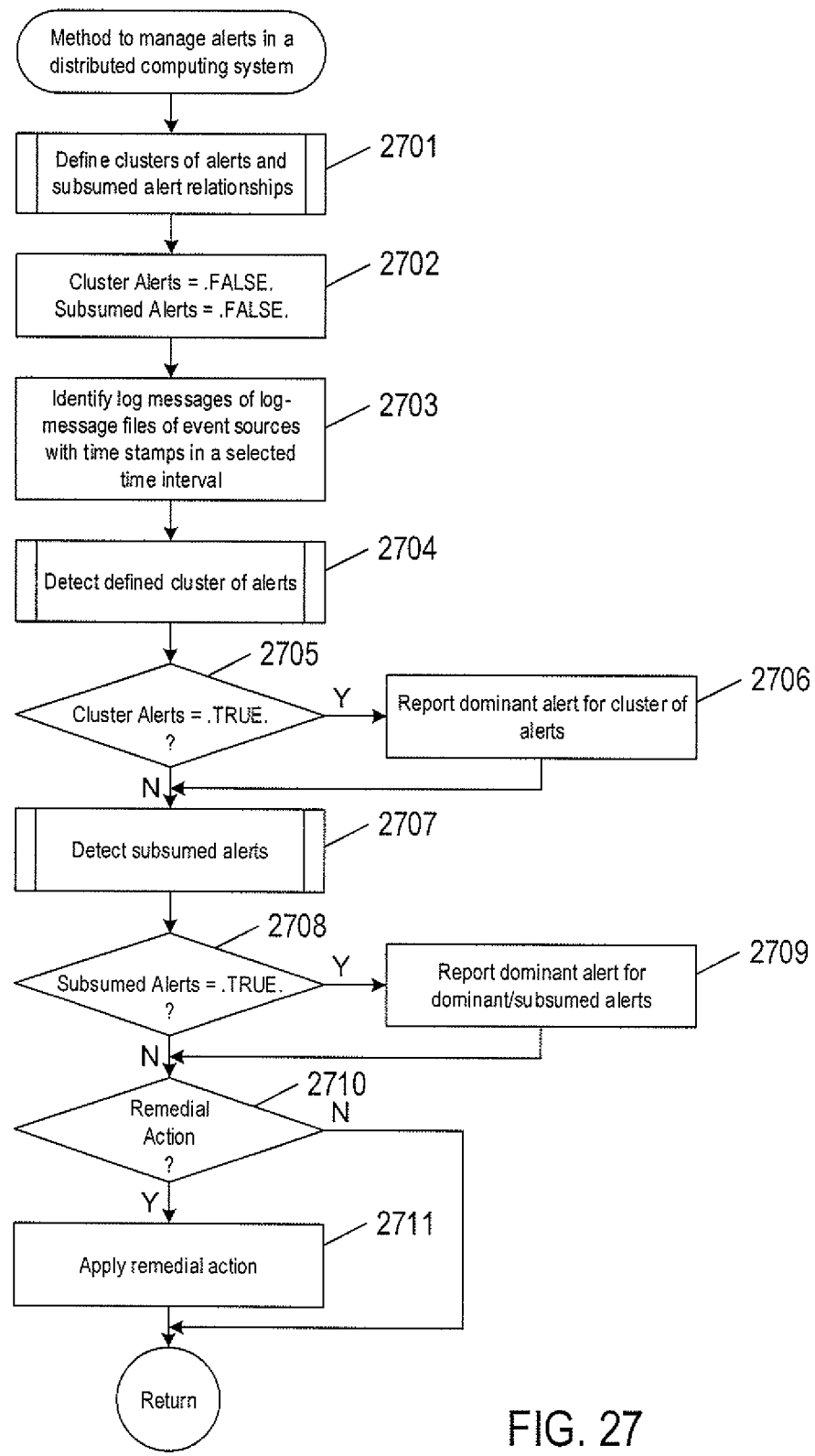
FIG. 27 shows a control flow diagram of a method to manage alerts in a distributed computing system.

FIG. 27 shows a control flow diagram of a method to manage alerts in a distributed computing system. In block 2701, a routine "define clusters of alerts and subsumed alert relationships" for event sources that run in a distributed computing system is called. For example, the event sources can be applications, distributed application nodes, operating systems, guest operating systems, VMs, or containers. In block 2702, logical parameters "cluster alerts" and "subsumed clusters" are initialized to FALSE. In block 2703, log-message files associated with the event sources stored in one or more data-storage devices in are identified. In block 2704, a routine "detect defined cluster of alerts" is called to detect a cluster of alerts defined in the routine represented by block 2701. In decision block 2705, when a defined cluster of alerts has been detected in the log-message files, the logical parameter "cluster alerts" is assigned TRUE in the routine of block 2704 and control flows to block 2706. In block 2706, the dominant alert defined for the cluster of alerts is reported to the system administrator. For example, the dominant alert may be reported in an email or a webhook as described above. In block 2707, a routine "detect subsumed alerts" is called to detect a dominant and any subsumed alerts defined in the routine represented by block 2701. In decision block 2708, when defined dominant and subsumed alerts have been detected in the log-message files, the logical parameter "subsumed alerts" is assigned TRUE in the routine of block 2707 and control flows to block 2709.

In block 2709, the dominant alert is the dominant alert reported to the system administrator for the dominant and subsumed alerts. For example, the dominant alert may be reported in an email or a webhook as described above. In decision block 2710, when remedial action has been assigned to the dominant alerts, control flows to block 2711. In block 2711, the remedial action associated with the dominant alert is executed. Certain dominant alerts may correspond to a set of instructions that are automatically executed when a dominant alert is detected. For example, problems associated with certain dominant alerts can be resolved with by instructions that automatically restart routers to remedy network failure represented by dominant alerts, automatically restart application nodes or VMs when the dominant alerts indicate the event sources are not responding, and automatically restart server computers when the dominant alerts indicate the event sources have slowed. Other dominant alerts that indicate insufficient computational resources of a server computer or a computer system used to run applications, VMs or containers, such as alerts indicating insufficient memory, CPU, or network throughput, may be remedied by automatically migrating VMs or containers from the server computer with such associated alerts to another server computer that has sufficient memory, CPU, or network throughput within the distributed computing system.

Figure 28:
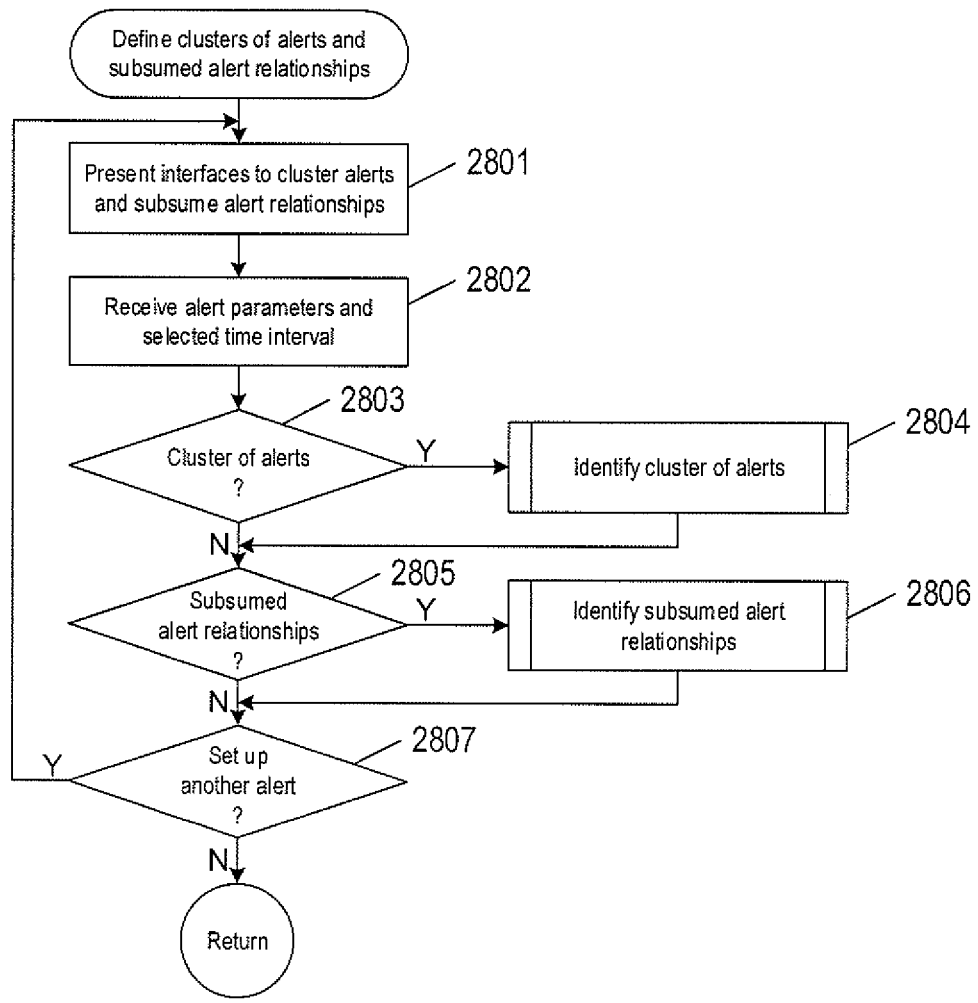
FIG. 28 shows a control flow diagram of the routine "define clusters of alerts and subsumed alert relationships" called in FIG. 27.

FIG. 28 shows a control flow diagram of the routine "define clusters of alerts and subsumed alert relationships" called in block 2701 of FIG. 27. In block 2801, GUIs, such as the GUIs 1900, 1916, and 1918, are displayed to define dominant alerts (i.e., dominant alerts), clusters of alerts, and dominant/subsumed alerts, as described above with reference to FIGS. 19A-19D. In block 2802, alert parameters, such dominant alert name, and a user selected time interval are received as described above with reference to FIGS. 19A-19D. In decision block 2803, when a user has selected clusters of alerts as represented by FIG. 19B, control flows to block 2804. In block 2804, a routine "identify clusters of alerts" is called. In decision block 2805, when a user has selected subsumed alert relationships as represented by FIG. 19D, control flows to block 2806. In block 2806, a routine "identify subsumed alert relationships" is called. In decision block 2807, the computational operations represented by blocks 2801-2806 are repeated for another alert.

Figure 29:
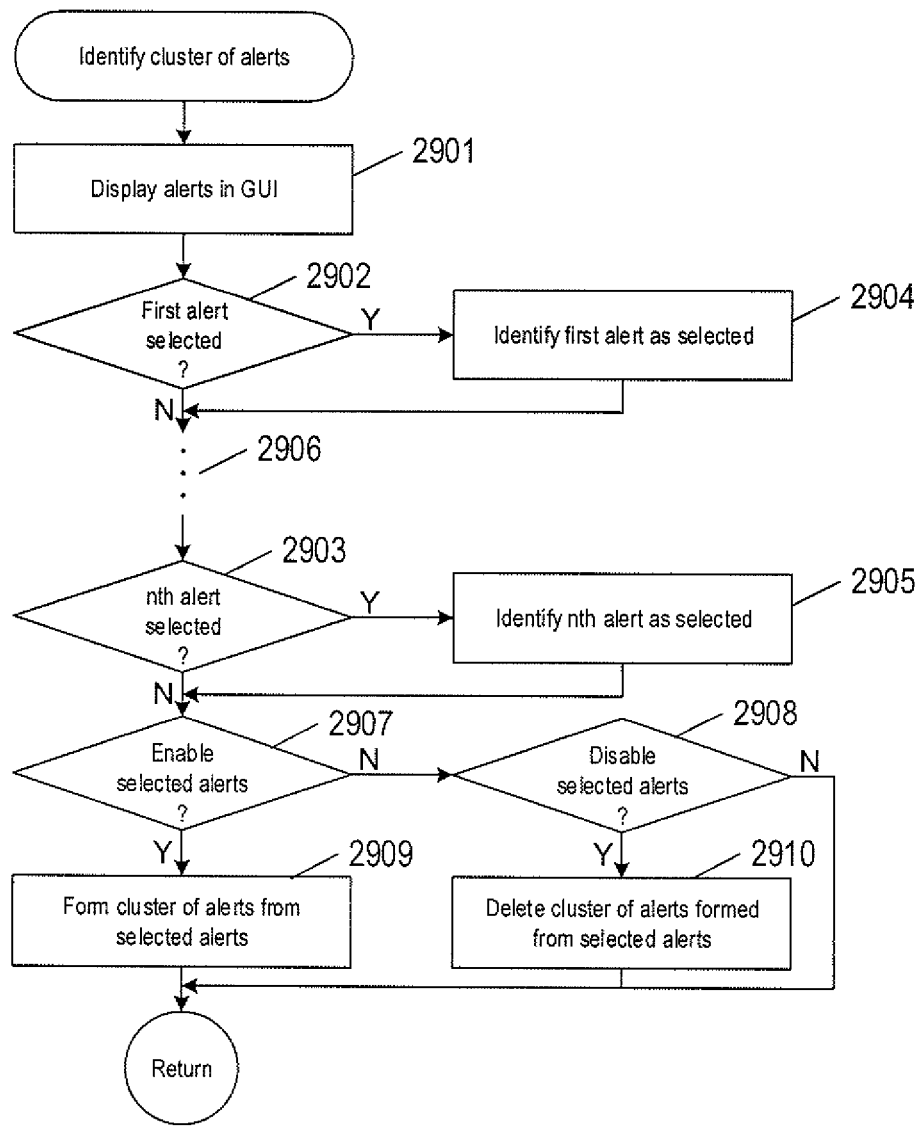
FIG. 29 shows a control flow diagram of the routine "identify cluster of alert" is called in FIG. 28.

FIG. 29 shows a control flow diagram of the routine "identify cluster of alert" is called in block 2804 of FIG. 28. In block 2901, alert names are displayed in a GUI as described above with reference to FIG. 19B. In decision blocks 2902 and 2903, a user selects an alert, such as by clicking on a box associated with the alerts listed in the GUI 1916 of FIG. 19B. In blocks 2904 and 2905, the alerts selected by the user is decision blocks 2902 and 2903 are associated with one another. Ellipsis 2906 represents alerts between the first alert and the nth alert. In decision block 2907, when an enable button is clicked on as described above with reference to FIG. 19B, control flows to block 2909. In block 2909, the selected and identified alerts form a cluster of alerts associated with a dominant alert. In decision block 2908, when a disable button is clicked on as described above with reference to FIG. 19B, control flows to block 2909. In block 2910, the selected and identified alerts that form a cluster of alerts is disabled.

Figure 30A:
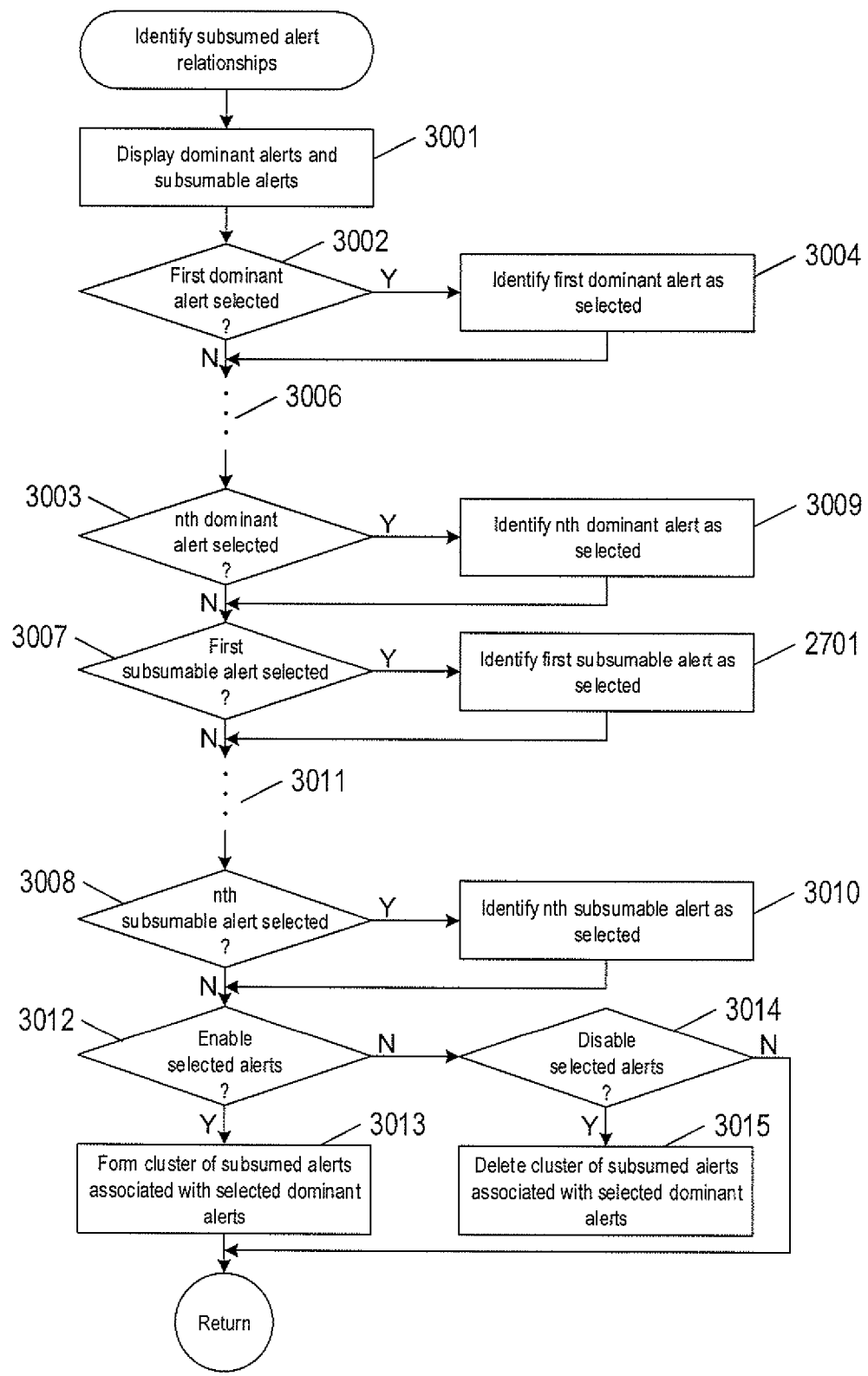
FIG. 30A shows a control flow diagram of the routine "identify subsumed alert relationship" is called in FIG. 28.

FIG. 30A shows a control flow diagram of the routine "identify subsumed alert relationship" is called in block 2806 of FIG. 28. In block 3001, alert names are displayed in a GUI as described above with reference to FIG. 19D. In decision blocks 3002 and 3003, a user selects one or more dominant alerts, such as by clicking on a box associated with the alerts listed in the window 1930 of FIG. 19D. In blocks 3004 and 3005, the dominant alerts selected by the user is decision blocks 3002 and 3003 are associated with one another. Ellipsis 3006 represents dominant alerts between the first dominant alert and the nth dominant alert. In decision blocks 3007 and 3008, a user selects subsumed alerts, such as by clicking on a box associated with the subsumed alerts listed in the window 1932 of FIG. 19D. In blocks 3009 and 3010, the subsumed alerts selected by the user in decision blocks 3007 and 3008 are associated with one another. Ellipsis 3011 represents alerts between the first subsumed alert and the nth subsumed alert. In decision block 3012, when an enable button is clicked on as described above with reference to FIG. 19D, control flows to block 3013. In block 3013, the selected and identified alerts form a cluster of alerts associated with a dominant alert. In decision block 3014, when a disable button is clicked on as described above with reference to FIG. 19D, control flows to block 3015. In block 3015, the selected and identified alerts that form a cluster of alerts is disabled.

Figure 30B:
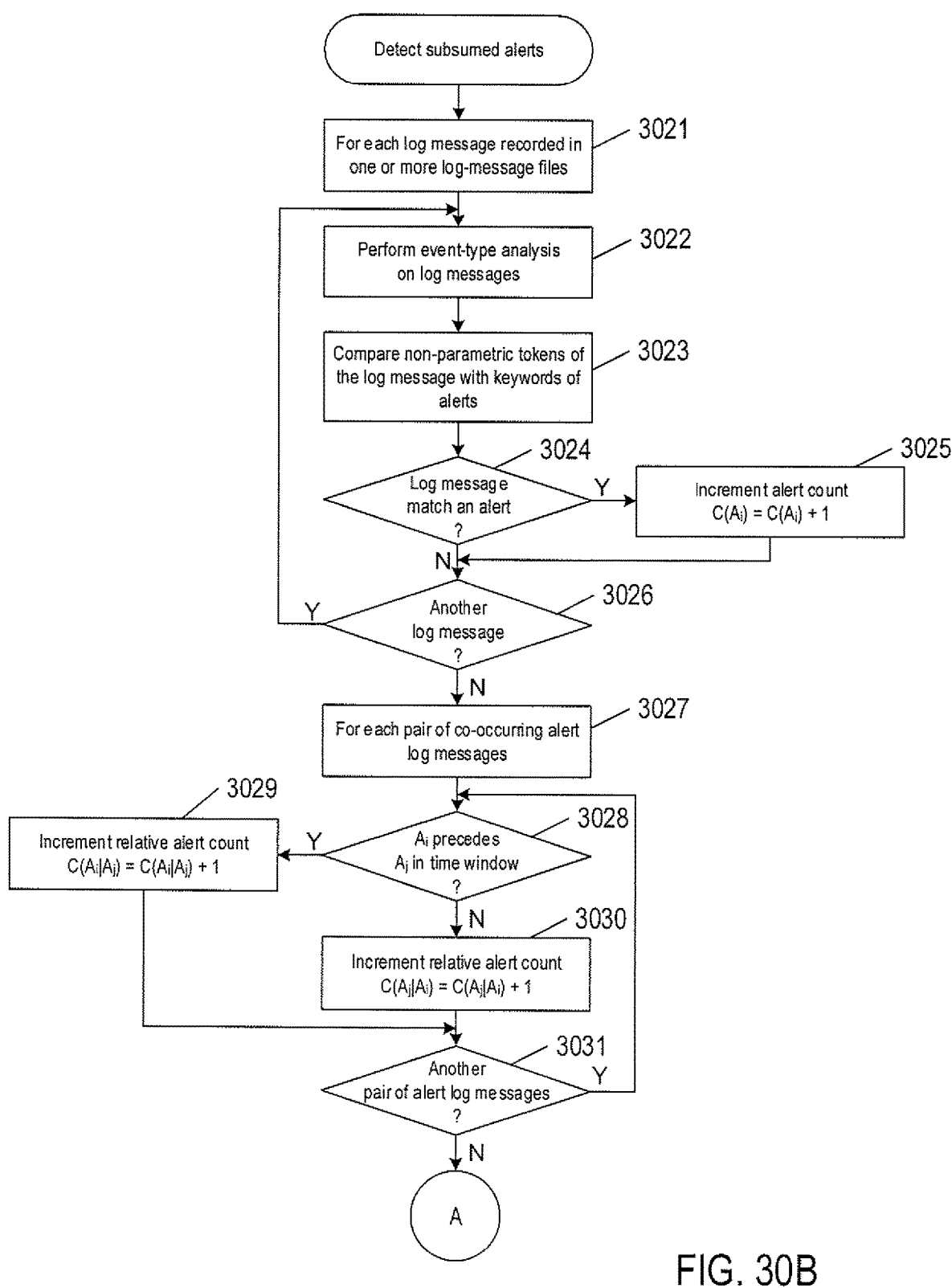
FIGS. 30B-30C show a control-flow of the routine "detect subsumed alerts" called in FIG. 27.
Figure 30C:
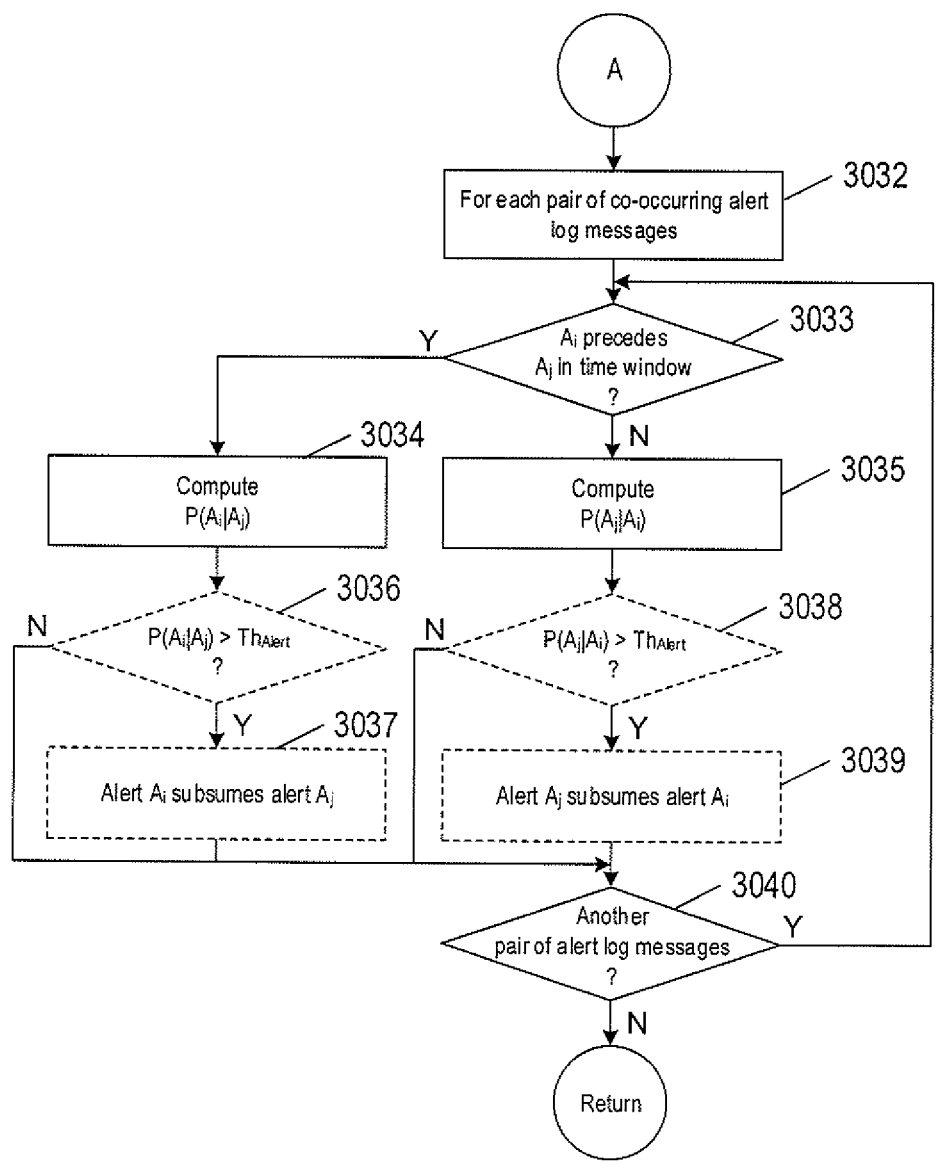

FIGS. 30B-30C show a control-flow of the routine "detect subsumed alerts" called in block 2707 of FIG. 27. A loop beginning with block 3021 repeats the operations represented by blocks 3022-3025 for each log message in one or more log-message files. In block 3022, event-type analysis is performed on each log message to identify the event type. In block 3023, non-parametric tokens of the log message are compared with keywords of each type of alert to determine if the log message is an alert log message and identify the alert recorded in the log message. In decision block 3024, if the log message matches an alert, control flows to block 3025 and alert count associated with the alert is incremented. Otherwise, control flows to decision block 3026 and blocks 3022-3025 are repeated for another log message in the one or more log-message files. A loop beginning with block 3027 repeats the operations represented by blocks 3028-3031 for each pair of co-occurring alert log messages with alerts $A_i$ and $A_j$ occurring in time limits of a same sliding time window. In decision block 3028, if the alert $A_i$ precedes the alert $A_j$, control flows to block 3029 in which a relative alert count $C(A_i|A_j)$ is incremented. Otherwise, control flows to block 3030 in which a relative alert count $C(A_j|A_i)$ is incremented. In decision block 3031, the operations represented by blocks 2928-2930 are repeated for another pair of alerts in the time limits of the sliding time window.

The control-flow diagram FIG. 30B continues in FIG. 30C. A loop beginning with block 3032 repeats the operations represented by blocks 3033-3040 for each pair co-occurring alert log messages. In decision block 3033, if the alert $A_i$ precedes the alert $A_j$, control flows to block 3034 in which the relative fraction $P(A_i|A_j)$ is computed as described above with reference to Equation (1). Otherwise, control flows to block 3035 in which the relative fraction $P(A_j|A_i)$ is computed as described above with reference to Equation (1). In one implementation, the operations represented by blocks 3036-3039 are omitted and the relative fractions are computed for each pair of alert log messages recorded with the sliding time window and are displayed with subsumed alerts, when control returns to the control-flow diagram in FIG. 27, the relative fractions are displayed next to each subsumed alert to enable a user to select subsumed alerts as described above with reference to FIG. 30D. In another implementation, dashed line blocks 3036-3039 represent automatic identification of subsumed alerts based on an alert threshold described above with reference to Equation (2). In decision block 3036, when $P(A_i|A_j)$ is greater than the alert threshold, control flows to block 3037 and the alert $A_i$ subsumes the alert $A_j$. In decision block 3038, when $P(A_j|A_i)$ is greater than the alert threshold, control flows to block 3039 and the alert $A_j$ subsumes the alert $A_i$. In decision block 3040, the operations represented by blocks 3033-3039 are repeated for each pair of co-occurring alerts.

Figure 31:
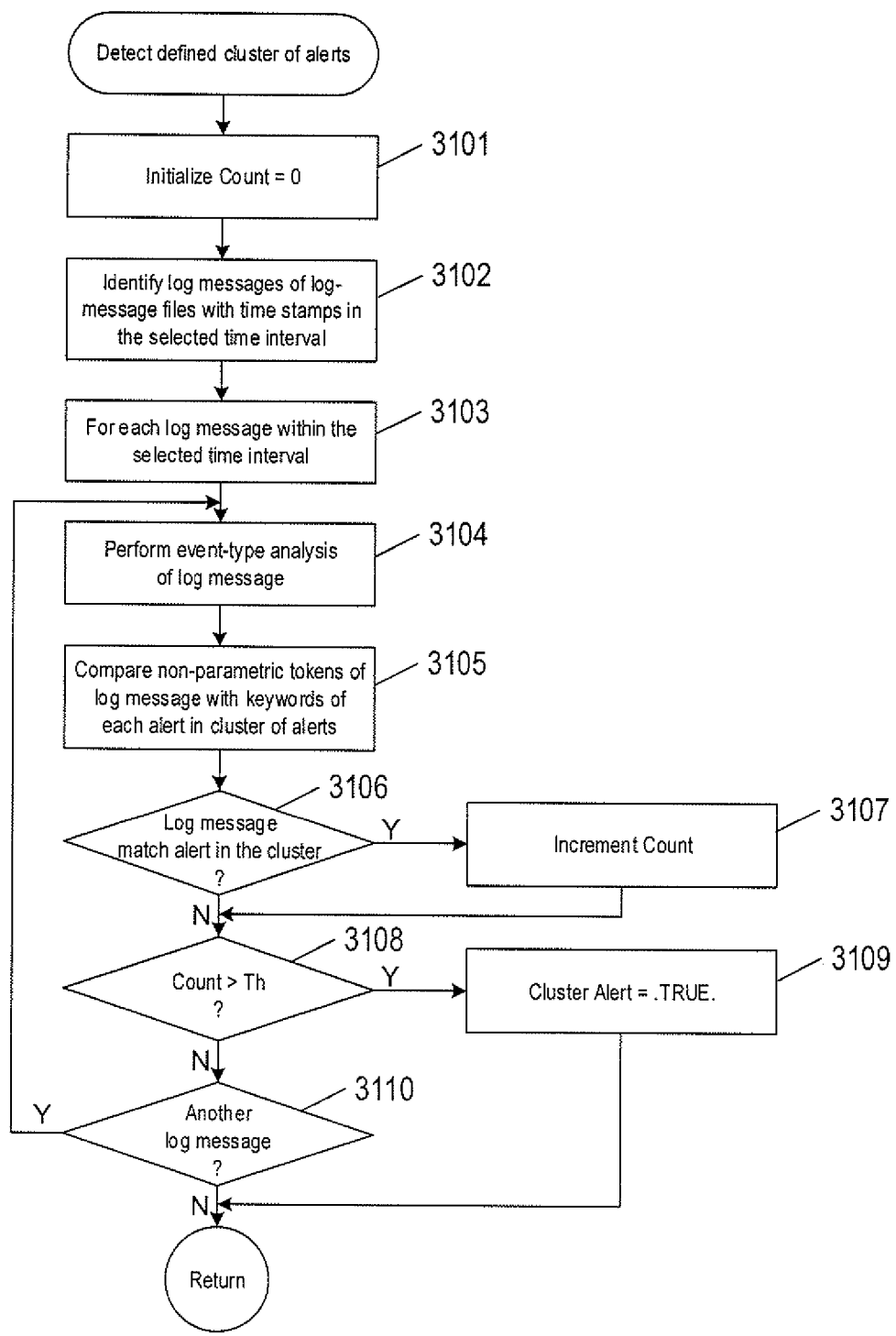
FIG. 31 shows a control flow diagram of the routine "detect defined cluster of alerts" is called in FIG. 27.

FIG. 31 shows a control flow diagram of the routine "detect defined cluster of alerts" is called in block 2704 of FIG. 27. In block 3101, a parameter "Count" is initialized to zero. In block 3102, log messages of log-message files with time stamps in the selected time interval are identified as described above with reference to FIGS. 23-25. In a loop beginning with block 3103, repeats the computational operations of blocks 3104-3110 for each log message in the selected time interval. In block 3104, event-type analysis described above with reference to FIG. 18 is applied to the log message to identify non-parametric tokens. In block 3105, the non-parametric tokens are compared with the keywords of each alert in the defined cluster of alerts. In decision block 3106, when a log message has non-parametric tokens that match the keywords of an alert in the cluster of alerts, control flows to block 3107. In block 3107, the parameter Count is incremented. In decision block 3108, when the parameter Court is greater than a threshold, control flows to block 3109. In block 3109, the logical parameter "cluster alert" is assigned the value TRUE, indicating that the defined cluster of alerts has been found in the log-message files within the selected time interval. In decision block 3110, computational operations of blocks 3104-3110 are repeated for another log message.

Figure 32:
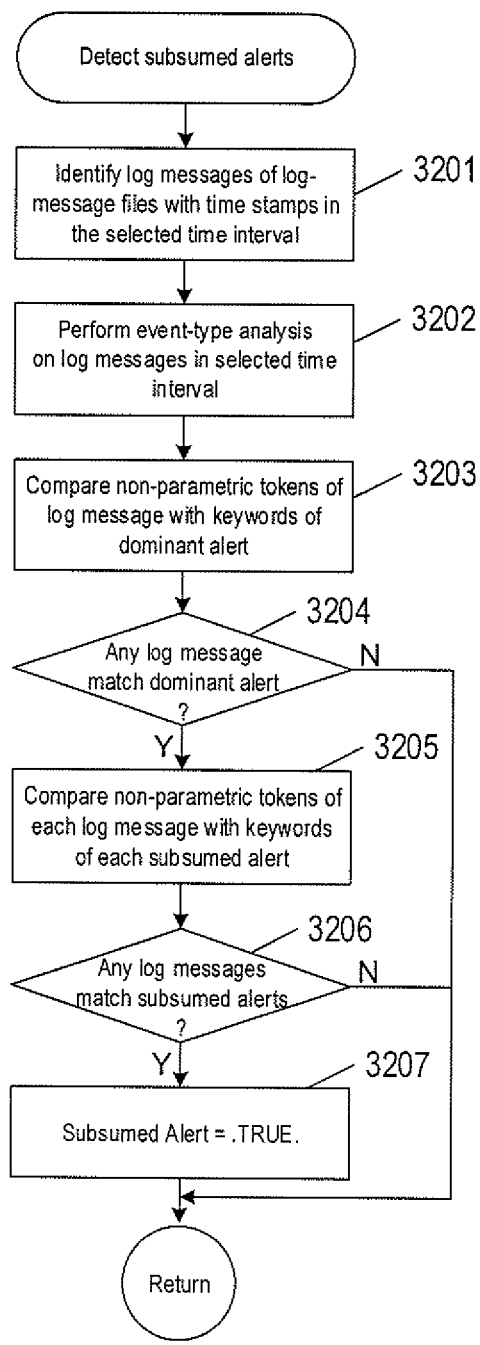
FIG. 32 shows a control flow diagram of the routine "detect subsumed alerts" is called in FIG. 27.

FIG. 32 shows a control flow diagram of the routine "detect subsumed alerts" is called in block 2707 of FIG. 27. In block 3201, log messages of log-message files with time stamps in the selected time interval are identified as described above with reference to FIGS. 23-25. In block 3202, event-type analysis described above with reference to FIG. 18 is applied to the log messages in the selected time interval to identify non-parametric tokens. In block 3203, the non-parametric tokens are compared with the keywords of each alert in selected dominant alerts. In decision block 3204, when a log message has non-parametric tokens that match the keywords of one or more of the dominant alerts, control flows to block 3205. In block 3205, the non-parametric tokens are compared with the keywords of each alert in selected subsumed alerts. In decision block 3206, when a log message has non-parametric tokens that match the keywords of the subsumed alerts, control flows to block 3207.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method stored in one or more data storage devices and executed using one or more processors of a computer system to manage alerts generated in response to log messages generated by one or more event sources that run in a distributed computing system, the method comprising: providing a graphical user interface that enables a user to define a dominant alert and select two or more subsumed alerts generated by the one or more event sources; searching log-message files of the one or more event sources for log messages that correspond to the two or more subsumed alerts; generating a single alert message that describes the dominant alert when a log message that corresponds to one of the two or more subsumed alerts is identified; and executing remedial action to correct a problem represented by the dominant alert.

2. The method of claim 1 wherein providing the graphical user interface comprises providing a graphical user interface that enables a user to select a duster of alerts for the one or more event sources, the duster of alerts comprises two or more alerts.

3. The method of claim 1 wherein providing the graphical user interface comprises providing a graphical user interface that enables a user to select the dominant alert and one or more subsumed alerts for the event sources, a cluster of two or more alerts comprises the dominant alert and the one or more subsumed alerts.

4. The method of claim 1 wherein searching the log-message files of the one or more event sources for log messages that correspond to the two or more subsumed alerts comprises: identifying log messages of one or more log-message files of the one or more event sources with time stamps in a selected time interval; determining the non-parametric tokens of each log message in the selected time interval; and comparing non-parametric tokens of each log message with keywords of each of the two or more subsumed alerts to detect log messages that correspond to the two or more subsumed alerts.

5. The method of claim 1 wherein searching the log-message files of the one or more event sources for log messages that correspond to the two or more subsumed alerts comprises: identifying log messages of one or more log-message foes of the one or more event sources with time stamps in a selected time interval; determining the non-parametric tokens of each log message in the selected time interval; comparing non-parametric tokens of each log message with keywords of each of the two or more subsumed alerts to detect a log message that corresponds to a dominant alert, the dominant alert is one of the selected two or more subsumed alerts and is the dominant alert; and comparing non-parametric tokens of each log message with keywords of each of the two or more subsumed alerts to detect one or more log messages that correspond to one or more subsumed alerts, the subsumed alerts are one or more of the two or more subsumed alerts.

6. The method of claim 1 wherein searching the log-message files of the one or more event sources that correspond to the two or more subsumed alerts comprises: identifying log messages of one or more log-message files of the one or more event sources; determining the non-parametric tokens of each log message: comparing non-parametric tokens with keywords that identify an alert; when a log message contains an alert, incrementing an alert count associated with the alert; and for each pair of alerts co-occurring in a sliding time window applied to the one or more log-message files, computing a relative alert count that represents a count of the number of times a pair of alerts are triggered in time limits of the sliding time window; and for each pair of alerts co-occurring in a sliding time window applied to the one or more log-message files, computing a relative fraction of a number of times a first of the pair of alerts is generated relative to a number of times a second of the pair of alerts is triggered based on the relative alert count and the count of the first alert, and displaying the relative fractions in the graphical user interface.

7. A system to manage alerts generated by one or more event sources that run in a distributed computing system, the system comprising: one or more processors; one or more data-storage devices: and machine-readable Instructions stored in the one or more data-storage devices that when executed using the one or more processors controls the system to perform operations comprising: providing a graphical user interface that enables a user to define a dominant alert and select two or more subsumed alerts generated by the one or more event sources; searching log-message files of the one or more event sources for log messages that correspond to the two or more subsumed alerts; generating a single alert message that describes the dominant alert when a log message that corresponds to one of the two or more subsumed alerts is identified; and executing remedial action to correct a problem represented by the dominant alert.

8. The system of claim 7 wherein providing the graphical user interface comprises providing a graphical user interface that enables a user to select a cluster of alerts for the one or more event sources, the cluster of alerts comprises two or more alerts.

9. The system of claim 7 wherein providing the graphical user interface comprises providing a graphical user interface that enables a user to select the dominant alert and one or more subsumed alerts for the event sources, a cluster of two or more alerts comprises the dominant alert and the one or more subsumed alerts.

10. The system of claim 7 wherein searching the log-message files of the one or more event sources for log messages that correspond to the two or more subsumed alerts: identifying log messages of one or more log message files of the one or more event sources with time stamps in a selected time interval; determining the non-parametric tokens of each log message in the selected time interval; and comparing non-parametric tokens of each log message with keywords of each of the two or more subsumed alerts to detect log messages that correspond to the two or more subsumed alerts.

11. The system of claim 7 wherein searching the log-message files of the one or more event sources for log messages that correspond to the two or more subsumed alerts: identifying log messages of one or more log-message files of the one or more event sources with time stamps in a selected time interval; determining the non-parametric tokens of each log message in the selected time interval; comparing non-parametric tokens of each log message with keywords of each of the two or more subsumed alerts to detect a log message that correspond to a dominant alert, the dominant alert is one of the selected two or more subsumed alerts and is the dominant alert; and comparing non-parametric tokens of each log message with keywords of each of the two or more subsumed alerts to detect one or more log messages that corresponds to one or more subsumed alerts, the subsumed alerts are one or more of the two or more alerts.

12. The system of claim 7 wherein searching the log-message files of the one or more event sources that correspond to the two or more subsumed alerts comprises: identifying log messages of one or more log-message foes of the one or more event sources; determining the non-parametric tokens of each log message; comparing non-parametric tokens with keywords that identify an alert; when a log message contains an alert, incrementing an alert count associated with the alert; and for each pair of alerts co-occurring in a sliding time window applied to the one or more log-message files, computing a relative alert count that represents a count of the number of times a pair of alerts are triggered in time limits of the sliding time window; and for each pair of alerts co-occurring in a sliding time window applied to the one or more log-message files, computing a relative fraction of a number of times a first of the pair of alerts is generated relative to a number of times a second of the pair of alerts is triggered based on the relative alert count and the count of the first alert, and displaying the relative fractions in the graphical user interface.

13. A non-transitory computer-readable medium encoded with machine-readable instructions that implement a method carried out by one or more processors of a computer system to perform operations comprising:

determining each type of alert recorded in log messages of one or more log-message files generated by one or more event sources;

determining a relative fraction of a pair of alerts co-occurring within a sliding time window applied to the one or more log-message files;

for each pair of alerts, identifying a first of the pair of alerts as a dominant alert and second of the pair of alerts as a subsumed alert when the relative fraction associated with the pair of alerts is greater than an alert threshold;

generating a single alert message that describes the dominant alert when a log message that corresponds to the subsumed alert co-occurs with the dominant alert; and executing remedial action to correct a problem represented by the dominant alert.

14. The method of claim 13 wherein determining each type of alert recorded in log messages of one or more log-message files comprises:

identifying log messages of one or more log-message files of the one or more event sources;

determining the non-parametric tokens of each log message;

comparing non-parametric tokens with keywords that identify the type of alert in each log message.

15. The method of claim 13 wherein determining the relative fraction of each pair of alerts co-occurring with the sliding time window comprises:

when a log message contains an alert, increment an alert count associated with the alert; and for each pair of alerts co-occurring in a sliding time window applied to the one or more log-message files, computing a relative alert count that represents a count of the number of times a pair of alerts are triggered in time limits of the sliding time window; and for each pair of alerts co-occurring in a sliding time window applied to the one or more log-message files, computing the relative fraction of the number of times a first of the pair of alerts is triggered relative to a number of times a second of the pair of alerts is triggered within time limits of the sliding time window based on the relative alert count of the pair of alerts and the count of the first alert.

\* \* \* \* \*